(12) United States Patent
Bitar et al.

(10) Patent No.: US 7,633,411 B2
(45) Date of Patent: Dec. 15, 2009

(54) DEVICE FOR SIGNALING RISKS, RISK LEVEL MAP OBTAINED BY THE DEVICE AND METHOD FOR FORMULATING THE MAP

(75) Inventors: Elias Bitar, Toulouse (FR); Nicolas Marty, Saint Sauveur (FR)

(73) Assignee: Thales (FR)

( * ) Notice: Subject to any disclaimer, the term of this patent is extended or adjusted under 35 U.S.C. 154(b) by 338 days.

(21) Appl. No.: 11/574,881

(22) PCT Filed: Jul. 27, 2005

(86) PCT No.: PCT/EP2005/053655

§ 371 (c)(1),
(2), (4) Date: Mar. 7, 2007

(87) PCT Pub. No.: WO2006/029935

PCT Pub. Date: Mar. 23, 2006

(65) Prior Publication Data

US 2007/0285283 A1 Dec. 13, 2007

(30) Foreign Application Priority Data

Sep. 7, 2004 (FR) .................................. 04 09463

(51) Int. Cl.
*G08G 5/04* (2006.01)
(52) U.S. Cl. ................. 340/970; 340/961; 340/947; 340/951; 340/959; 340/963; 340/967; 701/9; 701/14; 701/23; 701/36; 701/301

(58) Field of Classification Search ................. 340/970, 340/961, 947, 951, 959, 963, 967; 701/9, 701/14, 23, 36, 301
See application file for complete search history.

(56) References Cited

U.S. PATENT DOCUMENTS

| 5,892,462 | A | | 4/1999 | Tran | |
|---|---|---|---|---|---|
| 6,122,572 | A | * | 9/2000 | Yavnai | ........................ 701/23 |
| 6,480,120 | B1 | | 11/2002 | Meunier | |

(Continued)

FOREIGN PATENT DOCUMENTS

EP 0 750 238 A 12/1996

(Continued)

OTHER PUBLICATIONS

Borgefors, Gunilla, "Distance Transformation in Digital Images", Computer Vision, Graphics and Image Processing, vol. 34, pp. 344-378, Feb. 1986.

(Continued)

*Primary Examiner*—Tai T Nguyen
(74) *Attorney, Agent, or Firm*—Lowe Hauptman Ham & Berner, LLP

(57) ABSTRACT

The device relates to the signaling, to the pilot of a craft, of the risks that it incurs due to obstacles placed in its zone of deployment. This device determines, on the zone of deployment of the craft, the contours of several types of risk region as well as the contours of two lateral regions of tight deployment tied to the craft and produces alarms as a function of the types of zones at risk found in the lateral regions of tight deployment.

25 Claims, 12 Drawing Sheets

U.S. PATENT DOCUMENTS 6,665,063 B2 * 12/2003 Jamieson et al. ......... 356/141.1

FOREIGN PATENT DOCUMENTS

| FR | 2 842 594 A | 1/2004 |
|----|----|----|
| FR | 2842594 | 1/2004 |
| FR | 2 848 662 A | 6/2004 |
| FR | 2848662 | 6/2004 |
| FR | 2860292 | 4/2005 |
| FR | 2864312 | 6/2005 |
| FR | 2871879 | 12/2005 |

OTHER PUBLICATIONS

Danielsson, Per-Erik, "Euclidian Distance Mapping", Computer Vision, Graphics and Image Processing, vol. 14, pp. 227-248, Feb. 1980.

* cited by examiner

FIG.4b $(NO_{LAT} ; NO_{LON})$                                                                           $RES_{LAT}$ $RES_{LON}$                                                                           $(SE_{LAT}, SE_{LON})$

FIG.5

DEVICE FOR SIGNALING RISKS, RISK LEVEL MAP OBTAINED BY THE DEVICE AND METHOD FOR FORMULATING THE MAP

RELATED APPLICATIONS

The present Application is based on International Application No. PCT/EP2005/0053655, filed on Jul. 27, 2005, which in turn corresponds to French Application No. 04 09463 filed on Sep. 7, 2004, and priority is hereby claimed under 35 USC §119 based on these applications. Each of these applications are hereby incorporated by reference in their entirety into the present application.

FIELD OF THE INVENTION

The present invention relates to navigational aid for a craft subject to maneuverability and traversal constraints such as an aircraft deploying above a territory exhibiting forbidden over flight zones or relief's and obstacles to be circumvented since they are close or above its flight altitude. It relates more particularly to the signaling, to a craft, of the risks incurred because of the presence in its environment, of real or regulatory obstacles liable to impede or to hinder its progress.

BACKGROUND OF THE INVENTION

Various systems have already been proposed for evaluating such risks. The best known are the TAWS systems (acronym of the expression: "Terrain Awareness and Warning System") developed for aircraft with a view to forestalling the risks of collision with the ground. TAWS systems make a short-term trajectory forecast for the aircraft on the basis of the flight information (position, heading, orientation and amplitude of the speed vector) provided by the onboard equipment, situate it with respect to a map of the region over flown extracted from a terrain elevation database accessible from onboard and emit alarms destined for the crew of the aircraft whenever the short-term forecastable trajectory collides with the ground. Certain TAWS systems augment their alarms with rudimentary recommendations of the kind "Terrain Ahead, Pull up". Others also give information on the level of risk of collision incurred due to the relief's, the obstacles and the forbidden over flight zones present in the zone of deployment of the aircraft in the form of a map split up into regions of various colors depending on the significance of the risk incurred.

It is beneficial to go still further in navigational aid and to signal to the crew of a craft the potential dangers represented by certain parts of the domain of deployment of the craft even when they are not placed directly in the direction of movement of the craft, doing so in order to advise the crew of the craft as regards its freedom of deployment.

In this vein, the Applicant has proposed, in a French patent application FR 2,842,594 filed on Jul. 19, 2002, a system for preventing the risks of ground collision for aircraft, likening the risks of collision with the ground, to the penetration of the relief of the zone over flown into protection envelopes tied to the aircraft, quantifying them as a function of the time remaining for engaging a lateral avoidance turn of determined radius and displaying them on a navigation screen of the aircraft in the form of a map of the terrain zone over flown split up into regions of various colors corresponding to a risk scale. The Applicant has also proposed, in a French patent application filed on Dec. 19, 2003, under No. 0315020, that a maneuverability map representing the terrain zone over flown be displayed in the cockpit of an aircraft, as three types of region: a first type corresponding to the regions to be circumvented because they are considered to be uncrossable in view of the situation and of the present performance of the aircraft, for example, by a TAWS system or else because they form the subject of an over flight prohibition regulation, a second type corresponding to zones with restricted freedom of lateral deployment, constituted by marginal fringes surrounding the regions to be circumvented, of width corresponding to a minimum width necessary for the aircraft to describe, flat and at safety height, a diversion aerodrome and a third type of region complementary to the other two types, corresponding to zones of free lateral deployment. This navigation map, formulated on the basis of a terrain elevation database, implements a propagation distance transform for the placement of the outside contours of the zones with restricted freedom of lateral deployment.

Such a maneuverability map facilitates the navigation of an aircraft by signaling, in addition to the zones to be circumvented, the fringes of their neighborhood where the aircraft has its freedom of lateral deployment limited.

The Applicant has also proposed, in a French patent application filed on 16 Aug. 2004, under No. 04 06654, a system for signaling narrow passages of the trajectory of a flight plan where the freedom of lateral deployment of the aircraft is limited laterally by relief's or zones forming the subject of an over flight prohibition regulation. This system detects the risks of collision with the ground according to the procedure of the TAWS systems, by associating the risks of collision with the ground with the penetration of the relief or of forbidden zones into protection envelopes tied to the aircraft, containing a sufficient space to allow the aircraft to perform flat turns that are as tight as is permitted, while taking account of the wind.

SUMMARY OF THE INVENTION

It is an object of the present invention to provide a more complete signaling of the risks incurred by a craft on account of obstacles situated in its domain of progress taking account not only of the regions that are uncrossable because they are above the capabilities of the craft at the time, of the regions forming the subject of a crossing prohibition regulation and, possibly, of margins outside their contours where the craft has a restricted freedom of lateral deployment but also of the regions which would pose crossing problems to the craft if it changed behavior and adopted a fallback trajectory profile, envisaged in advance.

The present invention is directed to a device for signaling risks incurred by a craft on account of real or regulatory obstacles situated in its domain of progress comprising:
means for selecting a zone of deployment,
means for considering various types of risk region of the selected zone of deployment, of which a first type of risk region consisting of regions inaccessible to the craft because of its capabilities of crossing at the time or/and of regulatory forbidden crossing regions.
This device furthermore comprises:
means for determining a second type of risk region of the selected zone of deployment, consisting of the regions inaccessible to the craft after the adoption of a fallback trajectory profile envisaged in advance.
Advantageously, the device for signaling risks furthermore comprises:
means for determining, in the selected zone of deployment, a third type of risk region surrounding the regions of first and second types and constituting margins necessary for a free lateral deployment of the craft.

Advantageously, the device for signaling risks furthermore comprises:

means for determining, in the selected zone of deployment, of two lateral regions of tight deployment, to the right and to the left with respect to the position of the craft and to the direction of the course that it follows, defined on the basis of the ground trace of the trajectory which would be traversed by the craft if it performed a change of direction of a magnitude determined during a turn with radius of curvature also determined, detection means for detecting the points of the lateral zones of tight deployment belonging to one or more types of risk region, and alarm means triggered by the detection means at each detection of a a point of a lateral zone of tight deployment belonging to at least one type of risk region.

Advantageously, the alarm means produce various alarm levels according to the types of risk region detected in the lateral zones of tight deployment.

Advantageously, the alarm means deliver distinct alarms depending at one and the same time on the lateral zone of tight deployment concerned, right or left, and on the types of risk region detected in said lateral zone of tight deployment.

Advantageously, the detection means comprise means for scoring of the risk level allocating to each point of the two lateral regions of tight deployment, a score corresponding to:

a zero risk level when the point considered belongs to no type of risk region taken into consideration, a low risk level when the point considered belongs only to the third type of risk region not exhibiting the margins necessary for a free lateral deployment, a medium risk level when the point considered belongs to the second type of risk region constituting a threat only after the adoption of the fallback trajectory profile, and a high risk level when the point considered belongs to the first type of risk region constituting a threat since it is above the current capabilities of crossing of the craft or/and regulatory forbidden crossing capabilities, the alarm means delivering an alarm level corresponding to the larger risk level score assigned to the points of the two lateral regions of tight deployment and signaling the origin side of the threat by consideration of the right or left nature of the lateral region or regions of tight deployment comprising the points with larger risk score.

Advantageously, the device comprises display means showing the selected zone of deployment in the form of a map of zones at risk presenting under distinct appearances each of the types taken into account of risk region and the part of the selected zone of deployment complementary to the various types taken into account of risk region.

Advantageously, the craft is an aircraft, the first type of risk region corresponding to the uncrossable regions for the aircraft assuming that it acquires, after an arbitrarily fixed anticipation time, a maximum climb slope or/and to the regions whose crossing is regulatory forbidden to it, the second type of risk region corresponding to the regions uncrossable by the aircraft assuming that it holds a horizontal plateau after an arbitrarily fixed anticipation time and the third type of risk region corresponding to marginal fringes surrounding the regions of the first and second types, of width corresponding to that necessary for the aircraft to perform a complete flat turn with the shortest permitted radius and the two lateral regions of tight deployment corresponding to an arbitrary amplitude change of direction during a turn of also arbitrary radius of curvature.

Advantageously, when the craft is an aircraft, the determinations of the lateral regions of tight deployment take account of the local wind.

The present invention is also directed to a risk level map obtained by the above device for signaling risk noteworthy in that it displays, in a distinct manner, within a zone of deployment, a first type of region inaccessible to the craft because of its crossing capabilities at the time and/or regulatory forbidden crossing capabilities, a second type of region inaccessible to the craft after the adoption of a fallback trajectory profile and the parts of the zone of deployment complementary to the various types of region taken into account.

Advantageously, the risk level map displays, also in a distinct manner, a third type of region constituting margins necessary, about the first and second types of region for a free lateral deployment of the craft.

Advantageously, the risk level map presents, also in a distinct manner, two lateral regions of tight deployment, placed to the right and to the left with respect to the position occupied by the craft and to the direction of the course that it follows and defined on the basis of the arbitrary amplitudes of a change of direction and of a turning radius.

The present invention is alos directed to a method for formulating a risk level map comprising the following steps:

formulation of contours of a first type of risk region by application, to the elements of a terrain elevation database covering the zone of deployment of the craft, of a constrained distance transform having, as source point, a point in the neighborhood of the instantaneous position of the craft and, as constraint, a path profile adopting, after an arbitrarily fixed anticipation time, the maximum climb slope permitted for the craft, and complementation of the regions of the first type of risk region by regions with regulatory forbidden crossing whose contours are extracted from a database of forbidden zones, formulation of the regions belonging to the second type of risk region by application, to the elements of the terrain elevation database, of a constrained distance transform having, as source point, a point in the neighborhood of the instantaneous position of the craft and, as constraint, a path profile adopting, after an arbitrarily fixed anticipation time, the slope of the fallback trajectory profile, and allocation of distinct appearances to the points of the first and second types of risk region.

Advantageously, the method for formulating a risk level map furthermore comprises the following steps:

determination, as a function of the performance of the craft, of a minimum horizontal maneuvering distance allowing the craft to perform a complete turn, estimation of the distances with respect to the contours of the first and second types of risk region by means of a distance transform having the first and second types of risk region as source points, and placement of contours about the first and second types of risk region at the smallest distances complying at one and the same time with the minimum horizontal maneuvering distance and a minimum vertical distance with respect to the relief, and adoption of these contours in the guise of contours of the regions of third type.

Advantageously, the map formulation method furthermore comprises the following steps:

formulation, on either side of the instantaneous position of the craft and of its instantaneous course, of two lateral regions of tight deployment, tied to the instantaneous position of the craft and defined on the basis of the ground trace of the trajectory which would be traversed by the craft if it performed a change of direction, of a determined magnitude, during a turn with radius of curvature also determined on one and the other of the sides of the craft, and distinctive marking of the points of the two lateral regions of tight deployment as a function of their membership in regions of first, second or third type.

Advantageously, when the craft is an aircraft, account is taken, in the map formulation method, of the effects of the drifts due to the force and to the direction of the local wind, on the ground traces of the trajectories taken into account for the formulation of the two lateral regions of tight deployment.

As a variant, the method for formulating the map comprises the following steps:

formulation, on either side of the instantaneous position of the craft and of its instantaneous course, of two lateral regions of tight deployment, tied to the instantaneous position of the craft and corresponding, on one side and on the other, to the surfaces lying between two complete turns of the craft performed on one and the same side with different radii of curvature, and distinctive marking of the points of the two lateral regions of tight deployment as a function of their membership in regions of first, second or third type.

BRIEF DESCRIPTION OF THE DRAWINGS

Other characteristics and advantages of the invention will emerge from the description hereafter of an exemplary embodiment within the framework of a craft of the aircraft kind. This description will be offered in relation to the drawing in which:

a FIG. 1 illustrates an exemplary tagging, on a zone of deployment of an aircraft, of regions belonging to a first type of region corresponding to the regions of the zone of deployment whose crossing is presently out of range of the aircraft or which form the subject of a crossing prohibition regulation, a FIG. 2 shows a vertical flight trajectory profile followed by an aircraft seeking to take a maximum climb slope, a FIG. 3 represents an exemplary chamfer mask usable by a propagation distance transform, FIGS. 4a and 4b show the cells of the chamfer mask illustrated in FIG. 3, which are used in a scan pass according to lexicographic order and in a scan pass according to inverse lexicographic order, a FIG. 5 illustrates an exemplary tagging, on the same zone of deployment as FIG. 1, of regions belonging to a second type of risk region corresponding to the regions of the zone of deployment whose crossing becomes out of range of the aircraft when it adopts, from its instantaneous position, a fallback trajectory profile with zero slope, a FIG. 6 shows a vertical trajectory profile corresponding to a flattening out of an aircraft initially in descent, a FIG. 7 illustrates an exemplary tagging, on the same zone of deployment as FIGS. 1 and 5, of regions belonging to a third type of risk region where the aircraft has its freedom of lateral deployment limited by the proximity of the regions belonging to the first and/or second types of risk region, a FIG. 8 shows the trajectories considered for estimating the minimum horizontal distance necessary for a free lateral deployment of the aircraft, a FIG. 9 illustrates an exemplary tagging, on the same zone of deployment as FIGS. 1, 5 and 7, on each side of the instantaneous position of the aircraft, with respect to its course, of two lateral regions right and left, of tight deployment exhibiting a first configuration, a FIG. 10 illustrates, in an air reference frame tied to the aircraft, the circular trajectories followed by an aircraft performing a flat turn of like radius of curvature, on the right side and on the left side, a FIG. 11 shows the ground traces corresponding to the turns illustrated in FIG. 10, in the presence of a local wind, a FIG. 12 illustrates a second exemplary tagging, on the same zone of deployment as FIGS. 1, 5, 7 and 9, on each side of the instantaneous position of the aircraft, with respect to its course, of two lateral regions right and left, of tight deployment exhibiting a second configuration, a FIG. 13 illustrates a third exemplary tagging, on the same zone of deployment as FIGS. 1, 5, 7, 9 and 12, on each side of the instantaneous position of the aircraft, with respect to its course, of two lateral regions right and left, of tight deployment exhibiting a third configuration, a FIG. 14 illustrates, on the same zone of deployment as FIGS. 1, 5, 7 and 12, an example of risk level scores, of the mesh cells of the location grid belonging to lateral regions right and left, of tight deployment, a FIG. 15 is a chart illustrating the main steps of a method in accordance with the invention, of scoring the risk level presented by a point belonging to a zone of deployment where risk regions of the first, second and third types and lateral regions right and left of tight deployment have been tagged, and a FIG. 16 represents a diagram of a device for signaling risk according to the invention.

DETAILED DESCRIPTION OF THE EMBODIMENTS

The signaling of the risks associated with the various points of a terrain zone above which an aircraft is deploying is based on a selection of a zone of the terrestrial globe above which the aircraft is deploying, then on a mapping of the selected zone and on a tagging on the map obtained of various types of risk regions.

The selection of the zone concerned of the terrestrial globe as well as the determinations of its extent and of its orientation are done on the one hand, on the basis of information relating to the instantaneous position of the aircraft as well as the modulus and the direction of its instantaneous speed vector as given by the onboard instruments and on the other hand, on the basis of instructions given by the crew of the aircraft.

The mapping of the selected zone of the terrestrial globe is formulated on the basis of a terrain elevation and regulatory forbidden zones database, that is embedded onboard or can be consulted from the aircraft. It consists of a selection of points of the zone concerned of the terrestrial globe by means of a location grid which is either:

a grid regular distance-wise, aligned with the meridians and parallels, a grid regular distance-wise, aligned with the heading of the aircraft, a grid regular distance-wise, aligned with the course of the aircraft, a grid regular angular-wise, aligned with the meridians and parallels, a grid regular angular-wise, aligned with the heading of the aircraft, a grid regular angular-wise, aligned with the course of the aircraft, a polar (radial) representation centered on the aircraft and its heading, a polar (radial) representation centered on the aircraft and its course.

In the subsequent description, use will be made of a location grid regular distance-wise, aligned with the meridians and parallels, and defined by its north-west ($NO_{LAT}$ and $NO_{LON}$) and south-east ($SE_{LAT}$ $SE_{LON}$) corners, with for angular resolution, $RES_{LAT}$ on the latitude axis and $RES_{LON}$ on the longitude axis.

In the figures, the proportions between the mesh cells of the location grid and the surfaces of the various types of risk region are not complied with so as to improve the readability. Furthermore, and generally, the tiling elements or mesh cells of the location grid are marked with a digit taking the value 0 in the absence of risk to be signaled and a value different from zero in the converse case.

Figure 1:
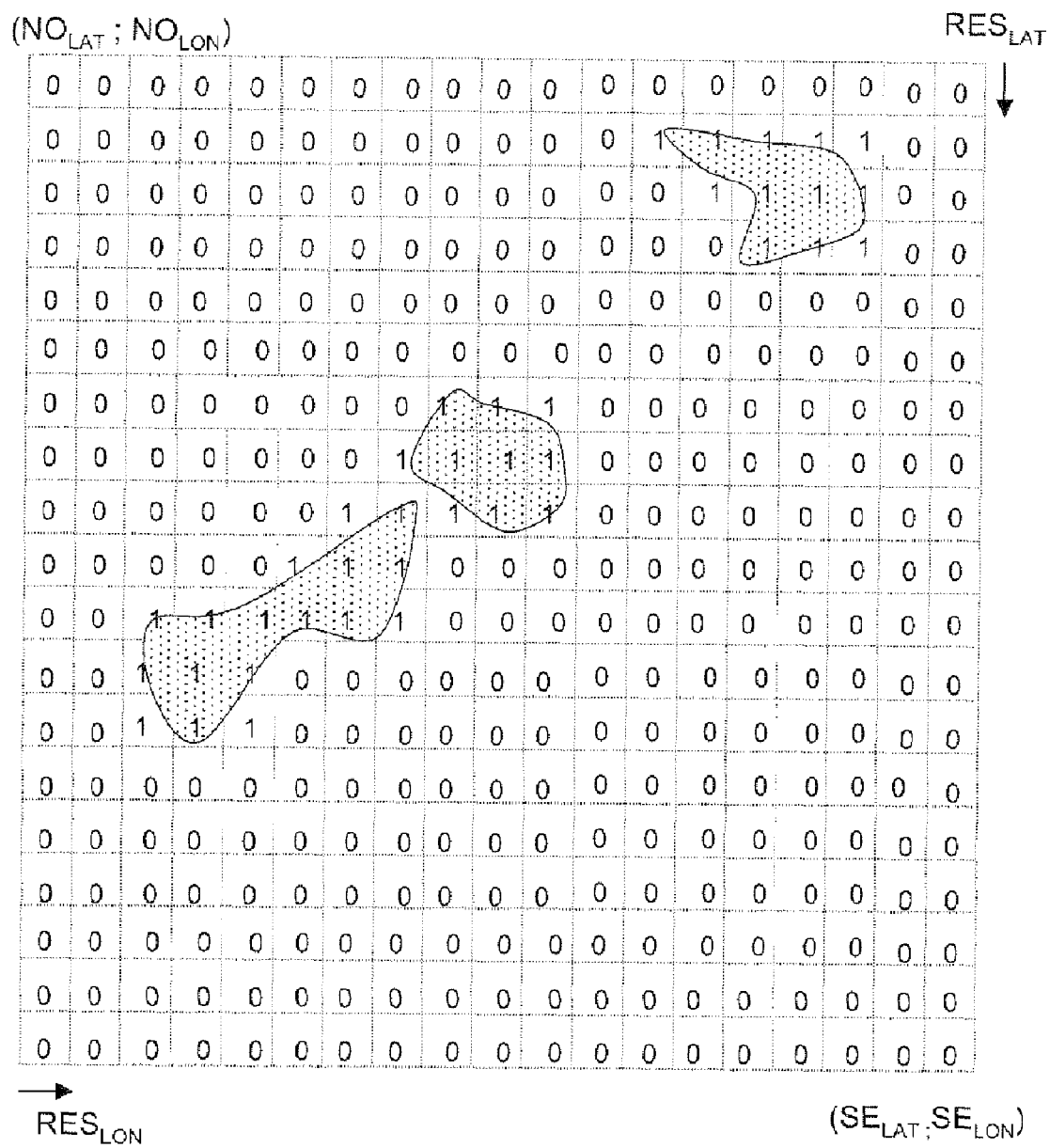

FIG. 1 shows the tagging of a first type $Z_{CLIMB}$ of risk region consisting of the regions uncrossable by the aircraft since they are above its capabilities of crossing at the time or/and regulatory forbidden over flight regions. This tagging is done by a marking $Z_{CLIMB}(i,j)$ of the cells of the mesh of the location grid belonging to the selected zone of deployment, taking the value 1 for the cells of the mesh that are contained entirely or in part in uncrossable regions and the value 0 for the others.

The regions uncrossable by the aircraft since they are above its capabilities of crossing at the time are those which cannot be over flown by the aircraft while complying with a safety height and adopting a maximum climb slope on a direct joining trajectory.

They can be determined by an onboard system for preventing the risks of collision with the ground of TAWS type which often liken them to a horizontal level cut of the relief made at the altitude of the region closest to the aircraft intercepting a protection volume tied to the aircraft, pointing in the direction of the motion of the aircraft and with a lower vertical profile corresponding to that of the vertical trajectory that the aircraft would follow if it took, after an arbitrary anticipation time, the maximum climb slope permitted to it by its performance at the time.

Figure 2:
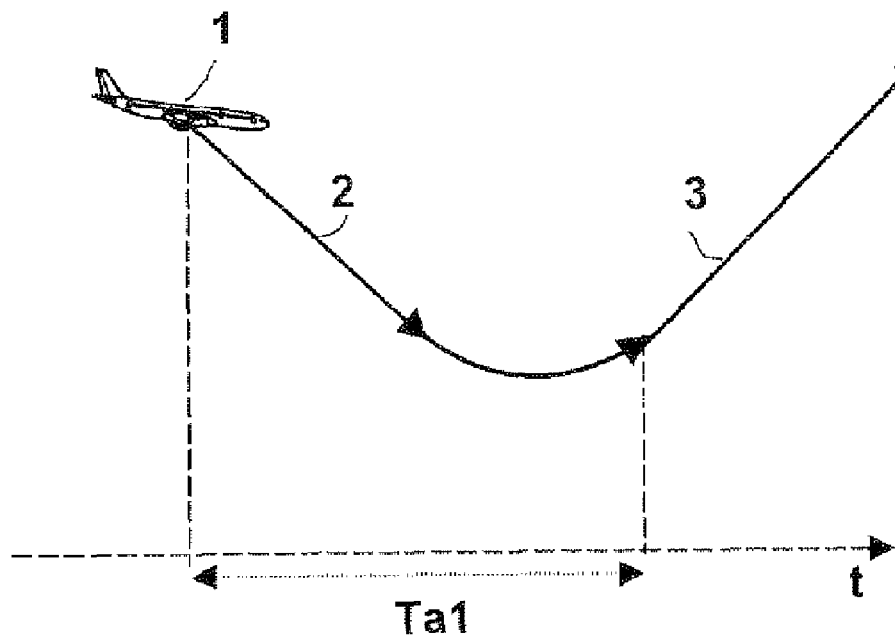

FIG. 2 illustrates the vertical trajectory profile adopted by a TAWS system, for the determination of the level of the horizontal cut of the relief adopted for the representation of the uncrossable regions. The aircraft 1 is initially assumed to follow a descent trajectory 2 and, after an anticipation time Ta1, taking account of the reaction time of the crew and of the time necessary for the change-of-slope flare out, to take a climb trajectory 3 with the maximum possible slope having regard to its flight performance at the time.

The regions uncrossable by the aircraft since they are above its crossing capabilities can be determined otherwise than by likening them to an intrusion of the relief into a protection volume tied to the aircraft. They can, for example, be determined by means of a constrained distance transform having, as source point, a point in the neighborhood of the instantaneous position of the craft, as static constraint, the crossing zones forbidden by regulation and, as dynamic constraint, a vertical path profile corresponding to that of FIG. 2. In this framework, the uncrossable zones appear as being at a distance noticeably greater than the straight line distance.

Distance transforms often referred to as propagation or chamfer mask transforms make it possible to estimate curvilinear distances between objects or between an origin point, the so-called source point and a destination point while taking account of constraints such as obstacles to be circumvented. The French patent application filed by the Applicant on Sep. 26, 2003, under No. 0311320 gives an exemplary use thereof to estimate the distance from an aircraft to the various points of a zone of deployment that are selected from a terrain elevation database while taking account of a vertical flight profile imposed on the aircraft.

Chamfer mask distance transforms appeared initially in image analysis to estimate distances between objects. Gunilla Borgefors describes examples thereof in her article entitled "Distance Transformation in Digital Images." published in the journal: Computer Vision, Graphics and Image Processing, Vol. 34, pp. 344-378 in February 1986.

The distance between two points of a surface is the minimum length of all the possible journeys over the surface starting from one of the points and ending at the other. In an image formed of pixels distributed according to a regular mesh of lines, columns and diagonals, a propagation distance transform estimates the distance of a pixel called the "goal" pixel with respect to a pixel called the "source" pixel by constructing progressively, starting from the source pixel, the shortest possible path according to the meshing of the pixels and ending at the goal pixel, and while being aided by the distances found for the image pixels already analyzed and by a so-called chamfer mask array cataloguing the values of the distances between a pixel and its near neighbors.

Figures 3, 4A, 4B:
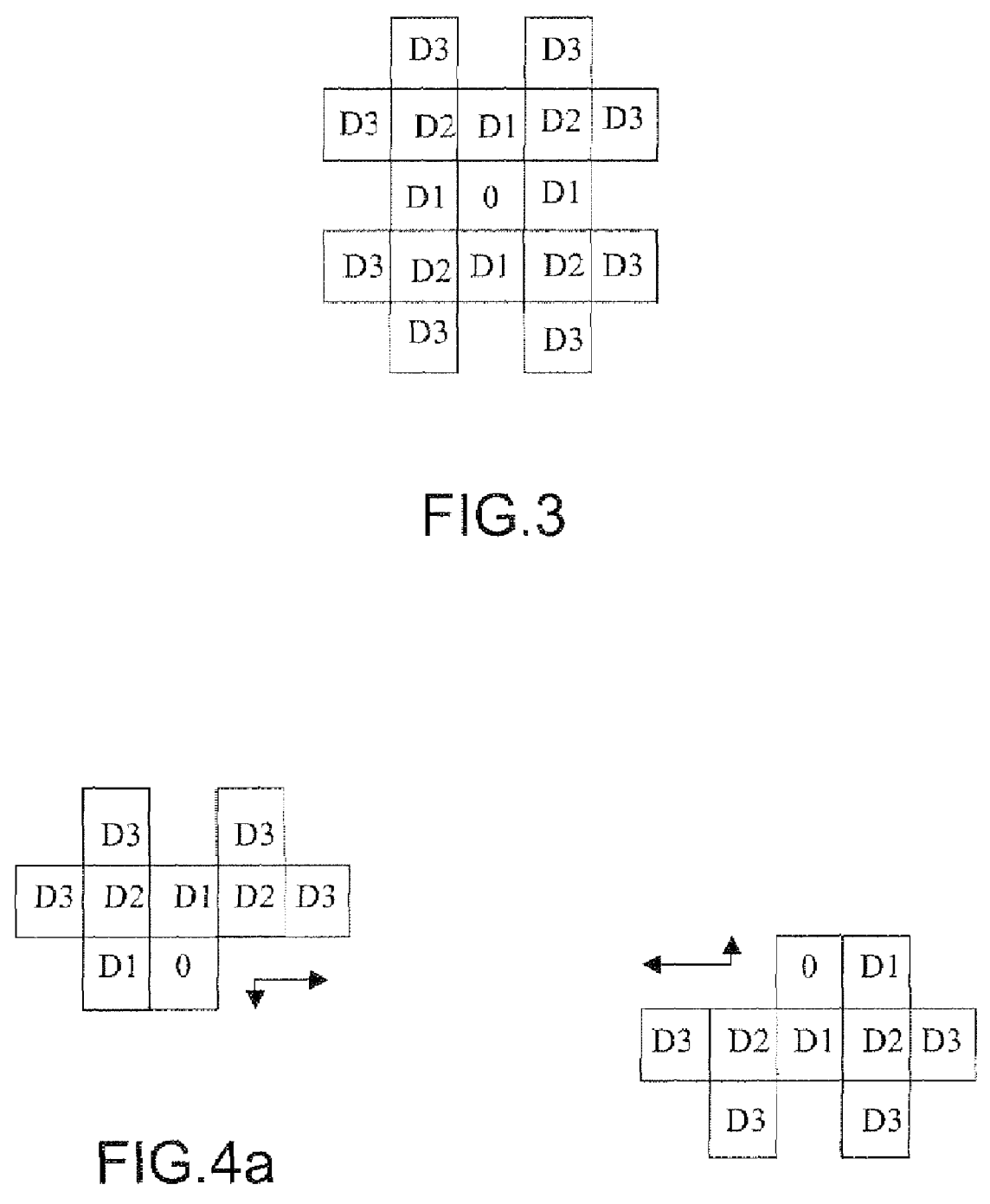

As shown in FIG. 3, a chamfer mask takes the form of an array with an arrangement of boxes reproducing the pattern of a pixel surrounded by its near neighbors. At the centre of the pattern, a box assigned the value 0 tags the pixel taken as origin of the distances catalogued in the array. Around this central box are clustered peripheral boxes filled with nonzero proximity distance values and employing the arrangement of the pixels of the neighborhood of a pixel assumed to occupy the central box. The proximity distance value appearing in a peripheral box is that of the distance separating a pixel occupying the position of the peripheral box concerned, from a pixel occupying the position of the central box. It is noted that the proximity distance values are distributed as concentric circles. A first circle of four boxes corresponding to the four pixels of first rank, which are the nearest to the pixel of the central box, either on the same line, or on the same column, are assigned a proximity distance value D1. A second circle of four boxes corresponding to the four pixels of second rank, which are pixels nearest the pixel of the central box that are placed on the diagonals, are assigned a proximity distance value D2. A third circle of eight boxes corresponding to the eight pixels of third rank, which are nearest the pixel of the central box while remaining off the line, the column and the diagonals occupied by the pixel of the central box, are assigned a proximity distance value D3.

The chamfer mask can cover a more or less extensive neighborhood of the pixel of the central box by cataloguing the values of the proximity distances of a greater or lesser number of concentric circles of pixels of the neighborhood. It can be reduced to the first two circles formed by the pixels of the neighborhood of a pixel occupying the central box or be extended beyond the first three circles formed by the pixels of the neighborhood of the pixel of the central box. It is customary to stop at the first three circles as for the chamfer mask shown in FIG. 3.

The values of the proximity distances D1, D2, D3 which correspond to Euclidian distances are expressed in a scale whose multiplicative factor permits the use of integers at the cost of a certain approximation. Thus, G. Borgefors adopts a scale corresponding to a multiplicative factor of 3 or 5. In the case of a chamfer mask retaining the first two circles of proximity distance values, hence of dimensions 3×3, G. Borgefors gives, to the first proximity distance D1 which corresponds to an echelon in terms of abscissa or ordinate and also to the multiplicative scale factor, the value 3 and, to the second proximity distance which corresponds to the root of the sum of the squares of the echelons in abscissa and ordinate $\sqrt{x^2+y^2}$, the value 4. In the case of a chamfer mask retaining the first three circles, hence of dimensions 5×5, she gives, to the distance D1 which corresponds to the multiplicative scale factor, the value 5, to the distance D2, the value 7 which is an approximation of $5\sqrt{2}$, and to the distance D3 the value 11 which is an approximation of $5\sqrt{5}$.

The progressive construction of the shortest possible path going to a goal pixel starting from a source pixel and following the meshing of the pixels is done through a regular scanning of the pixels of the image by means of the chamfer mask.

Initially, the pixels of the image are assigned an infinite distance value, in fact a number high enough to exceed all the values of the distances measurable in the image, with the exception of the source pixel or pixels which are assigned a zero distance value. Next, the initial distance values assigned to the goal points are updated during the scanning of the image by the chamfer mask, an update consisting in replacing a distance value allocated to a goal point with a new lesser value resulting from a distance estimate made on the occasion of a new application of the chamfer mask to the goal point considered.

A distance estimation by applying the chamfer mask to a goal pixel consists in cataloguing all the paths going from this goal pixel to the source pixel and passing through a pixel of the neighborhood of the goal pixel whose distance has already been estimated during the same scan, in searching among the catalogued paths for the shortest path or paths and in adopting the length of the shortest path or paths as distance estimate. This is done by placing the goal pixel whose distance one wishes to estimate in the central box of the chamfer mask, selecting the peripheral boxes of the chamfer mask corresponding to pixels of the neighborhood whose distance has just been updated, by calculating the lengths of the shortest paths connecting the goal pixel to be updated to the source pixel while passing through one of the selected pixels of the neighborhood, by addition of the distance value assigned to the pixel of the neighborhood concerned and of the proximity distance value given by the chamfer mask, and in adopting, as distance estimate, the minimum of the path length values obtained and of the old distance value assigned to the pixel undergoing analysis.

At the level of a pixel under analysis by the chamfer mask, the progressive search for the shortest possible paths starting from a source pixel and going to the various goal pixels of the image gives rise to a phenomenon of propagation towards the pixels that are the nearest neighbors of the pixel under analysis and whose distances are catalogued in the chamfer mask. In the case of a regular distribution of the pixels of the image, the directions of the nearest neighbors of a pixel not varying are considered as axes of propagation of the chamfer mask distance transform.

The order of scanning of the pixels of the image influences the reliability of the distance estimates and of their updates because the paths taken into account depend thereon. In fact, it is subject to a regularity constraint which means that if the pixels of the image are tagged in lexicographic order (pixels ranked in a line-by-line increasing order starting from the top of the image and progressing towards the bottom of the image, and from left to right within a line), and if a pixel p has been analyzed before a pixel q then a pixel p+x must be analyzed before the pixel q+x. The lexicographic, inverse lexicographic (scanning of the pixels of the image line by line from bottom to top and, within a line, from right to left), transposed lexicographic (scanning of the pixels of the image column by column from left to right and, within a column, from top to bottom), inverse transposed lexicographic (scanning of the pixels in columns from right to left and within a column from bottom to top) orders satisfy this regularity condition and more generally all the scans in which the lines and columns are scanned from right to left or from left to right. G. Borgefors advocates a double scan of the pixels of the image, once in lexicographic order and then again in inverse lexicographic order.

The analysis of the image by means of the chamfer mask may be done according to a parallel process or a sequential process. For the parallel process, one considers the distance propagations from all the points of the mask that are made to pass over the entire image in several scans until there is no longer any change in the distance estimates. For the sequential process, the distance propagations are considered only from half the points of the mask. The upper half of the mask is made to pass over all the points of the image through a scan in lexicographic order and then the lower half of the mask over all the points of the image in inverse lexicographic order.

FIG. 4a shows, in the case of the sequential process and of a scan pass scanning in lexicographic order going from the top left corner to the bottom right corner of the image, the boxes of the chamfer mask of FIG. 3 that are used to catalogue the paths going from a goal pixel placed on the central box (box indexed by 0) to the source pixel, passing through a pixel of the neighborhood whose distance has already been the subject of an estimation during the same scan. These boxes are eight in number, arranged in the top left part of the chamfer mask. There are therefore eight paths catalogued for the search for the shortest whose length is taken as distance estimate.

FIG. 4b shows, in the case of the sequential process and of a scan pass scanning in inverse lexicographic order going from the bottom right corner to the top left corner of the image, the boxes of the chamfer mask of FIG. 3 that are used to catalogue the paths going from a goal pixel placed on the central box (box indexed by 0) to the source pixel, passing through a pixel of the neighborhood whose distance has already been the subject of an estimation during the same scan. These boxes are complementary to those of FIG. 4a. They are also eight in number but arranged in the bottom right part of the chamfer mask. There are therefore again eight paths catalogued for the search for the shortest whose length is taken as distance estimate.

The propagation distance transform whose principle has just been recalled briefly was designed originally for the analysis of the positioning of objects in an image but it was soon applied to the estimation of distances on a relief map extracted from a terrain elevation database with regular meshing of the terrestrial surface. Specifically, such a map does not explicitly have a metric since it is plotted on the basis of the elevations of the points of the meshing of the terrain elevation database of the zone represented. In this context, the propagation distance transform is applied to an image whose pixels are the elements of the terrain elevation database belonging to the map, that is to say, of the elevation values associated with the latitude, longitude geographical coordinates of the nodes of the mesh where they have been measured, ranked, as on the map, by increasing or decreasing latitude and longitude according to a two-dimensional array of latitude and longitude coordinates.

For terrain navigation of craft such as robots, the chamfer mask distance transform is used to estimate curvilinear distances taking account of zones that are uncrossable by reason of their rugged configurations or of a prohibition of regulatory origin. To do this, an attribute of a forbidden zone may be associated with the elements of the terrain elevation database appearing in the map. This attribute signals, when it is activated, an uncrossable or forbidden zone and prohibits any update other than an initialization, of the distance estimation made by the chamfer mask distance transform.

In the case of an aircraft on which a vertical flight profile is imposed, the configuration of the uncrossable zones evolves as a function of the altitude resulting from following the vertical flight profile. During the formulation of a map of curvilinear distances covering the region over flown, this manifests itself by the fact that the propagation distance transform propagates over the points of the image that is constituted by elements of the terrain elevation database, at one and the same time, the altitude that the aircraft would take at this point after having traversed a joining path of minimum length while complying with its vertical flight profile, termed propagated altitude, and a measurement of distance from the aircraft termed propagated distance and by the fact that the propagated distance at a point is taken into account for a distance estimation only if the associated propagated altitude is above the elevation of the point considered appearing in the database. Ultimately, the points belonging to uncrossable zones since they are above the current crossing performance of the aircraft lie with curvilinear distances that are estimated much above their distances by sight from the aircraft, thereby making it possible to rapidly distinguish them from the other points of the selected zone of the terrestrial globe.

Figure 5:
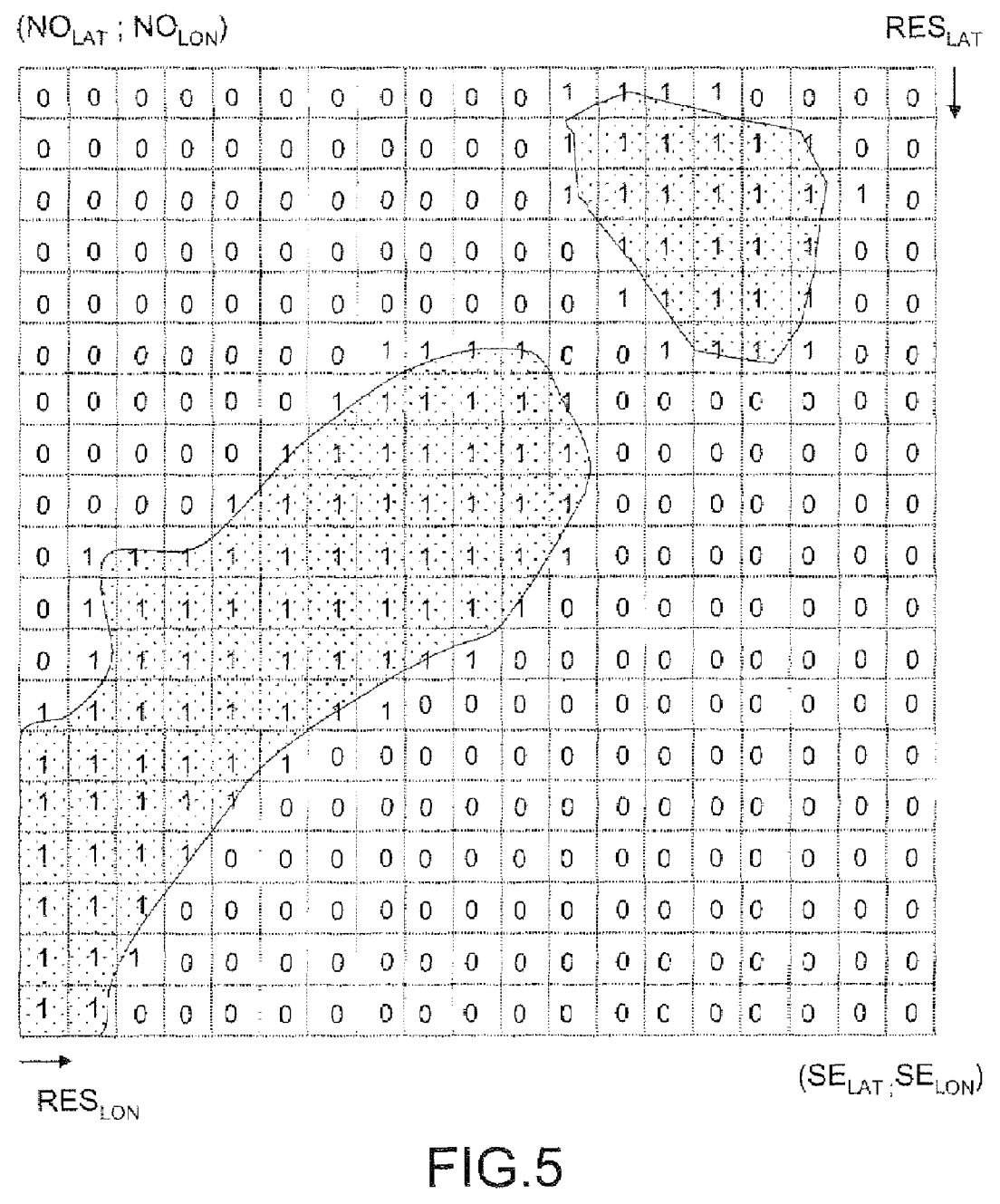

FIG. 5 shows the tagging, on the same zone of deployment as FIG. 1, of a second type of risk region $Z_{LEVEL}$ consisting of the regions inaccessible to the craft after the adoption of a fallback trajectory profile corresponding to a flattening out of the aircraft's trajectory obtained after an arbitrary anticipation time. This tagging is done by a marking $Z_{LEVEL}(i,j)$ of the cells of the mesh of the location grid belonging to the selected zone of deployment, taking the value 1 for the cells of the mesh that are contained entirely or in part in inaccessible regions after a flattening out and the value 0 for the others.

Figure 6:
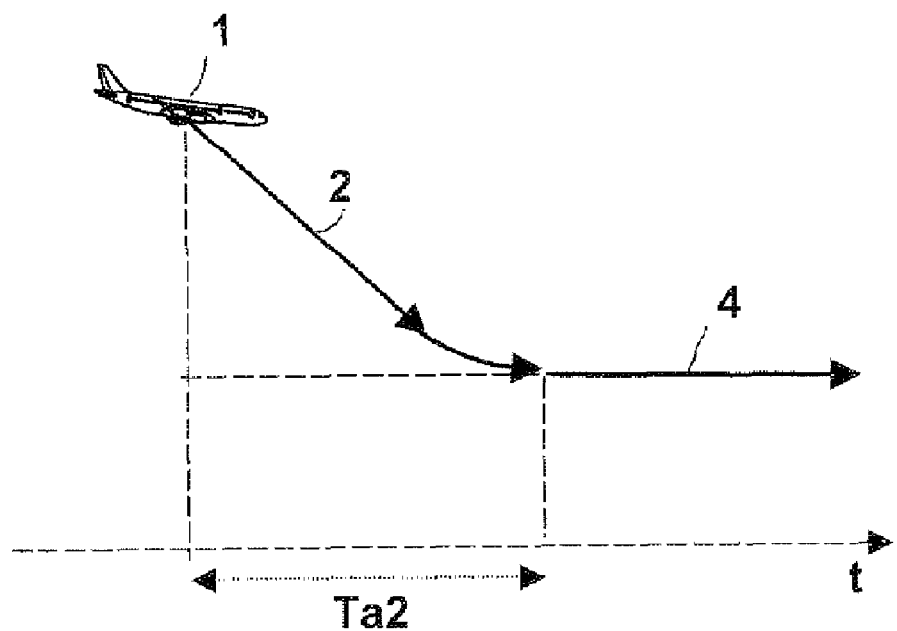

FIG. 6 illustrates the vertical profile of a fallback trajectory culminating in a flattening out. The aircraft 1 is initially assumed to follow a descent trajectory 2 and, after an anticipation time Ta2, taking account of the reaction time of the crew and of the time necessary for the change-of-slope flare out, to take a horizontal trajectory 4.

The determination of the second type of risk region $Z_{LEVEL}$ is done according to the same procedures as that of the first type of risk region $Z_{CLIMB}$, by exchanging the vertical trajectory profile represented in FIG. 2 with that represented in FIG. 6.

Figure 7:
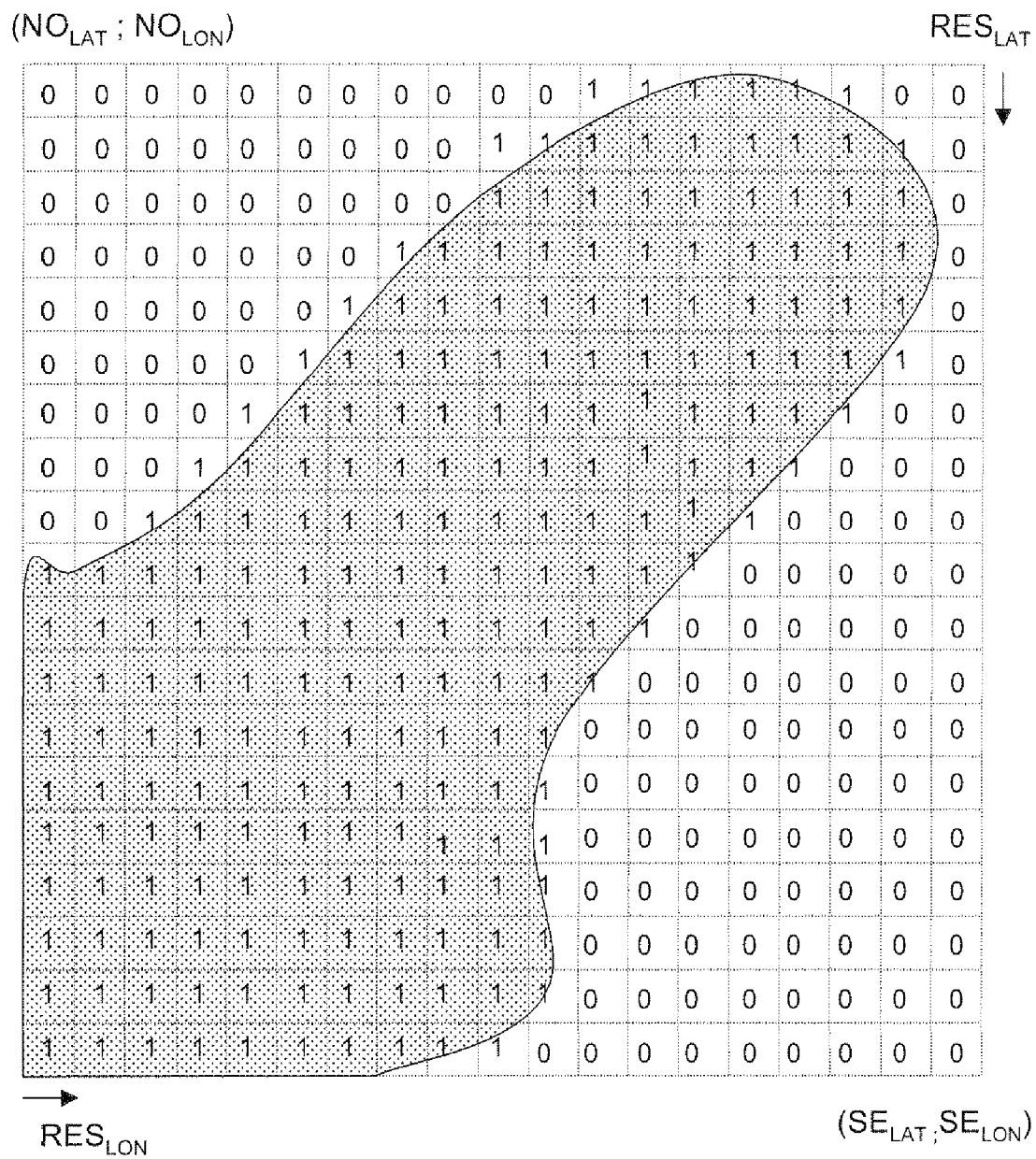

FIG. 7 shows the tagging, on the same zone of deployment as FIG. 1, of a third type of risk region $Z_{TURN}$ consisting of the regions where the aircraft has a limited freedom of lateral deployment on account of the proximity of a risk region of the first or of the second type $Z_{CLIMB}$ or $Z_{LEVEL}$. This tagging is done by a marking $Z_{TURN}(i,j)$ of the cells of the mesh of the location grid belonging to the selected zone of deployment, taking the value 1 for the cells of the mesh that are contained entirely or in part in regions with limited or nonexistent freedom of lateral deployment and the value 0 for the others. It involves the drawing about the contours of the risk regions of the first and second types $Z_{CLIMB}$ and $Z_{LEVEL}$, of margins having at any point the minimum width necessary for the aircraft in order that it retains its short or medium term freedom of lateral deployment.

This minimum width takes account of a minimum vertical distance with respect to the relief dictated by safety obligations and of a horizontal distance threshold Sd.

The minimum vertical distance with respect to the relief can be taken into account at the level of the terrain elevation database or subsequently, during a pre-plot consisting in widening the contours of the first and second types of risk region until complying everywhere with the minimum vertical distance before or after the consideration of the horizontal distance threshold Sd.

The horizontal distance threshold Sd can be defined, in the case of an aircraft, on the basis of the:
aeronautical procedures,
required safety margins,
current flight parameters of the aircraft,
flight conditions defined by the flight envelope of the aircraft.

It is possible in particular to admit that an aircraft preserves its short or medium term freedom of lateral deployment if it is capable of describing a diversion aerodrome, on one side or the other of its current trajectory without modifying its current speed or being subjected in a turn to mechanical stresses exceeding a certain tolerance threshold expressed by a limit roll angle. Under this hypothesis, the distance threshold to be complied with is the radius of the circle circumscribed about the two possible trajectories for a diversion aerodrome, increased by a safety margin.

Figure 8:
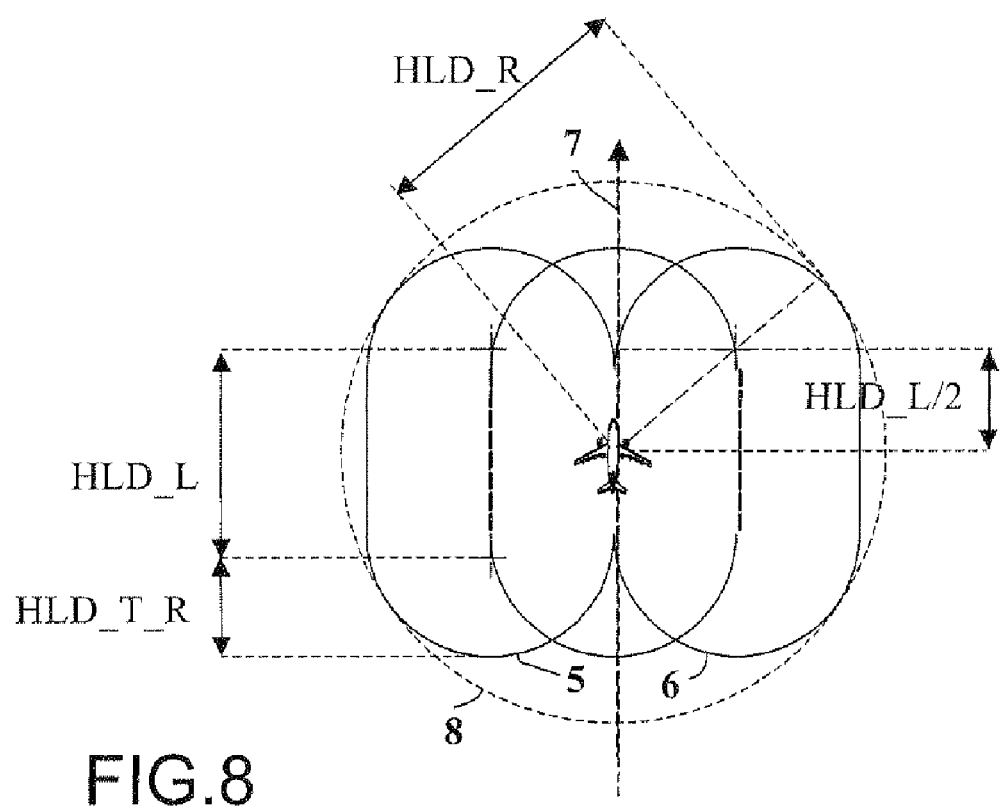

As shown in FIG. 8, the two possible trajectories 5, 6 for the diversion aerodrome form two lobes tangential to the current trajectory 7 of the aircraft. Each of them comprises two lengths HLD_L joined by two half-turns of radius HLD_T.

The value of the lengths HLD_L is a configuration data item defined in terms of flight time or distance traversed on the ground. The value of the radius HLD_T of the half-turns assumed to be performed flat, at ground speed GS and at constant roll angle HLD_B, satisfies the relation:

$$HLD\_T = \frac{GS^2}{g \times \tan(HLD\_B)}$$

the ground speed GS being a data item provided by the equipment of the aircraft, HLD_B a configuration data item calculated as a function of the theoretical performance of the aircraft and g the acceleration due to gravity.

The value of the radius HLD_R of the circle 8 circumscribed about the two possible trajectories 5, 6 for the diversion aerodrome, satisfies the relation:

$$HLD\_R = HLD\_T + \sqrt{\left(\frac{HLD\_L}{2}\right)^2 + HLD\_T^2}$$

Ultimately, the horizontal distance threshold Sd adopted for the width of the bands surrounding the obstacles to be circumvented takes the value:

$$Sd = HLD\_M + HLD\_T + \sqrt{\left(\frac{HLD\_L}{2}\right)^2 + HLD\_T^2}$$

HLD_M being an additional safety margin with respect to the radius HLD_R of the circle circumscribed about the two possible trajectories of the diversion aerodrome.

To place the outside contours of the margins which constitute the third type of risk region $Z_{TURN}$ about the first and second types of risk region $Z_{CLIMB}$ and $Z_{LEVEL}$, at a distance corresponding to the horizontal distance threshold Sd, it is again possible to call upon the propagation distance or chamfer transform but this time with a view to estimating distances with respect to the contours of objects consisting of the first and second types of risk region $Z_{CLIMB}$ and $Z_{LEVEL}$ possibly widened to take account of the minimum vertical distance to be complied with relative to the relief. It is also possible to call upon another distance transform termed a vector distance transform (or "Signed Euclidian Distance Transform"). Per-Erik Danielsson describes examples thereof in an article entitled "Euclidian distance mapping" Computer Vision, Graphics and Image Processing, Vol. 14, pp. 227-248 in 1980.

This vector distance transform is based on the fact that the location of a pixel can be deduced from the locations of its nearest neighbors. It borrows the principle of a chamfer mask distance transform but with a mask consisting of an array gathering together the components, in units of axes of the reference frame, (abscissa x and ordinate y in the 2D case) of the distances separating the pixel under analysis placed at the centre of the mask, from the pixels which are its nearest neighbors, which distances are oriented in the direction of the pixel under analysis. Thus each pixel of an image subjected to a vector distance transformation is assigned components of a location vector.

Figure 9:
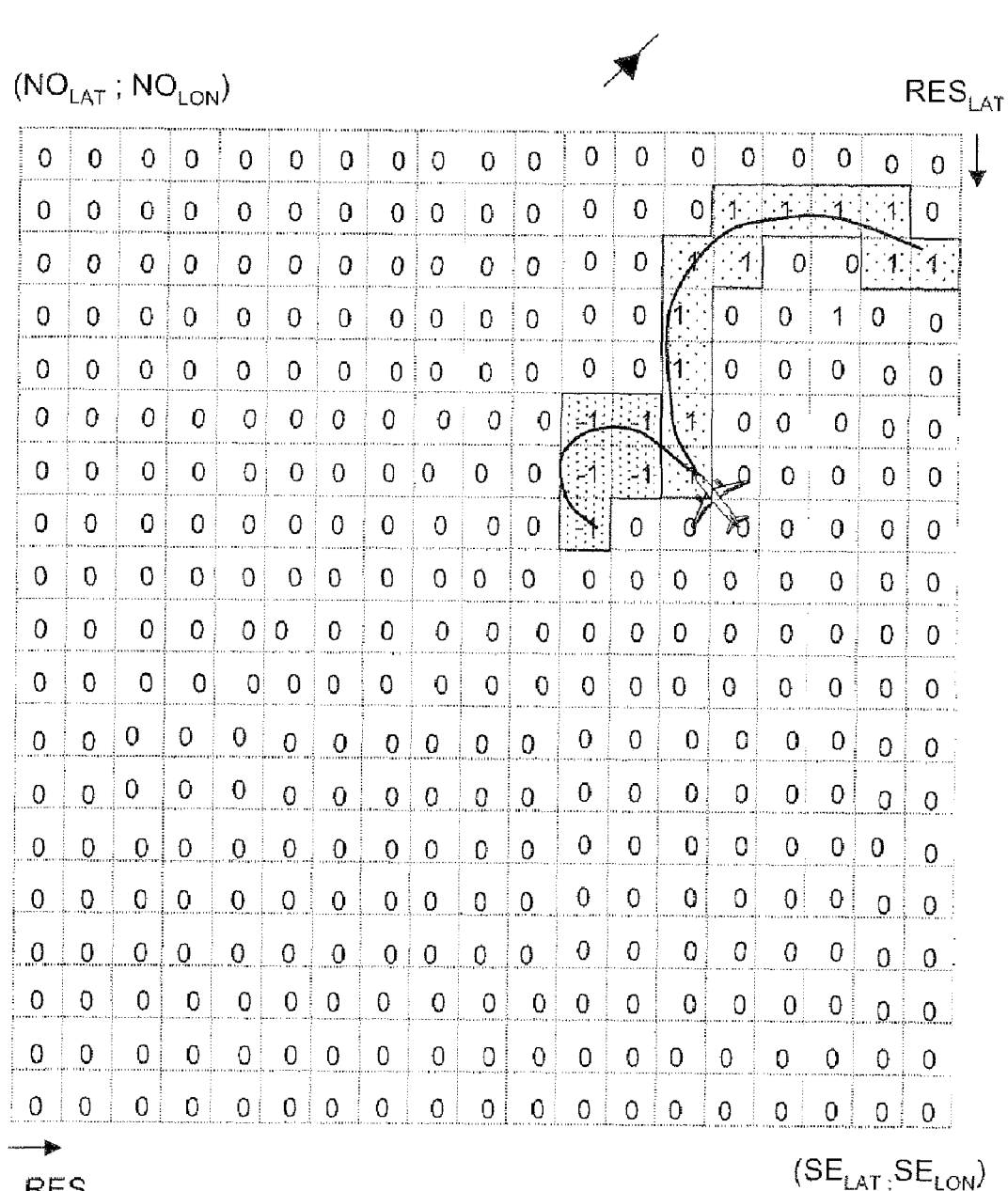

FIG. 9 shows the tagging on the same zone of deployment as FIGS. 1, 5 and 7 of two lateral zones of tight deployment $Z_{EVOL}$ tied to the aircraft, placed to the right and to the left of its course and consisting of the mesh cells of the zone of deployment traversed by the ground traces, in the presence of a local wind, of two tight turns, of like radius of curvature, performed by the aircraft on its right side and on its left side, in its descent or climb plane or in a horizontal plane until effecting a change of course chosen arbitrarily here equal to a half-turn. The radius of curvature adopted for the tight turns can be, without this necessarily being the case, the smallest radius of curvature acceptable at the time as a function of the performance of the aircraft and of the comfort conditions to be complied with. The tagging is done by a marking $Z_{EVOL}$ (i,j) of the cells of the mesh of the location grid belonging to the selected zone of deployment, taking the value 1 for the cells of the mesh that are contained entirely or in part in the right lateral zone of tight deployment $Z_{EVOL}$, the value −1 for the cells of the mesh that are contained entirely or in part in the left lateral zone of tight deployment $Z_{EVOL}$ and the value 0 for the others. It makes it possible to distinguish the points of the two lateral zones of tight deployment $Z_{EVOL}$, from one another and in relation to the remainder of the selected zone of deployment.

Figure 10:
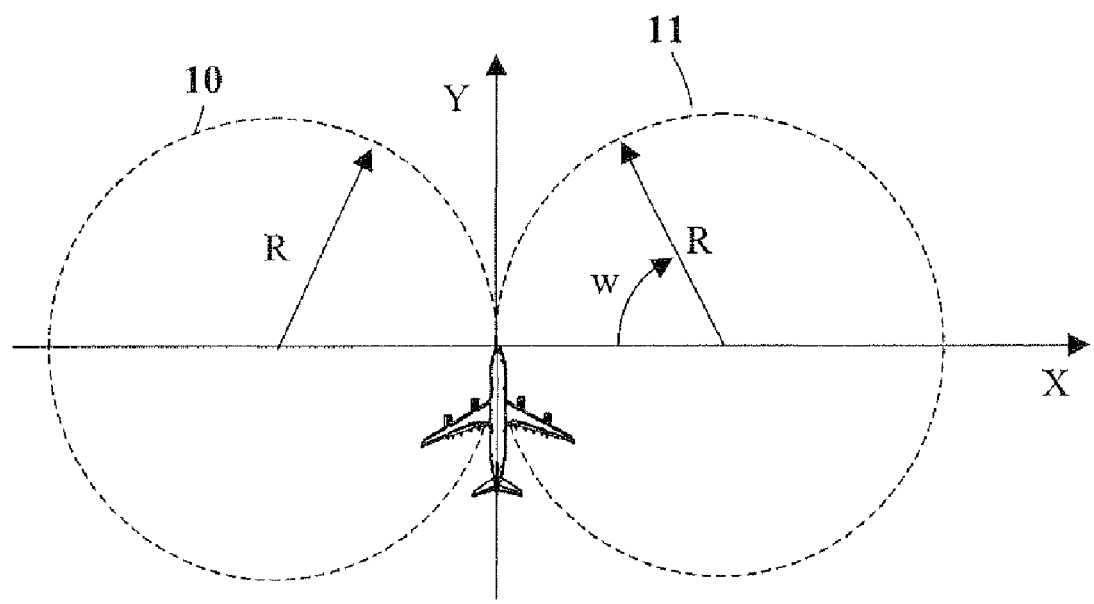

With no wind, as shown in FIG. 10, an aircraft effecting a flat turn, on its right or on its left, with a radius of curvature R follows the ground traces corresponding to two circles 10, 11 of radius R passing through the position of the aircraft, having a common tangent oriented along the heading of the aircraft (vector $\vec{Y}$) These circles 10, 11, satisfy the system of parametric equations:

$$\begin{pmatrix} x \\ y \end{pmatrix}(t) = \begin{pmatrix} \delta \cdot R \cdot [1 - \cos(wt + \gamma)] \\ R \cdot \sin(wt + \gamma) \end{pmatrix}$$

with $$R = \frac{TAS^2}{g \cdot \tan\varphi_{roll}}$$

$$w = \frac{TAS}{R} = \frac{g \cdot \tan\varphi_{roll}}{TAS}$$

$\varphi_{roll}$ being the angle of roll of the aircraft during the maneuver, $\gamma$ being a factor dependent on the initial conditions, $\delta$ being a coefficient equal to +1 for a turn to the right and −1 for a turn to the left.

The air speed of the aircraft, when it traverses these circles may then be written:

$$\begin{pmatrix} \dot{x} \\ \dot{y} \end{pmatrix}(t) = \begin{pmatrix} \delta \cdot Rw \cdot \sin(wt + \gamma) \\ Rw \cdot \cos(wt + \gamma) \end{pmatrix} \quad (1)$$

Assuming that the local wind is constant in speed and direction, the circles 10, 11 leave a cycloid-shaped trace on the ground. The system of parametric equations of this trace may be obtained by integrating the system of parametric equations for the air speed of traversal over the circles.

When the wind is taken into account, the system (1) of parametric equations for the speed of the aircraft, expressed in a ground reference frame X Y whose ordinate axis Y is oriented along the heading of the aircraft, becomes:

$$\begin{pmatrix} \dot{x} \\ \dot{y} \end{pmatrix}(t) = \begin{pmatrix} \delta \cdot Rw \cdot \sin(wt + \gamma) + WS_X \\ Rw \cdot \cos(wt + \gamma) + WS_Y \end{pmatrix} \quad (2)$$

$$\begin{pmatrix} WS_X \\ WS_Y \end{pmatrix} \text{ being the wind vector}$$

By integration, we obtain, in this ground reference frame, the system of parametric equations for the trace:

$$\begin{pmatrix} x \\ y \end{pmatrix}(t) = \begin{pmatrix} WS_X \cdot t - \delta \cdot R \cdot \cos(wt + \gamma) + C_X \\ WS_Y \cdot t + R \cdot \sin(wt + \gamma) + C_Y \end{pmatrix}$$

$C_x$ and $C_y$ being integration constants which depend on the reference frame considered.

In an air reference frame $X_h$, $Y_h$, whose ordinate axis Y is oriented along the heading of the aircraft, the system of parametric equations (1) becomes:

$$\begin{pmatrix} \dot{x} \\ \dot{y} \end{pmatrix}_{t=0} = \begin{pmatrix} \delta \cdot Rw \cdot \sin(wt + \gamma) + WS_{Xh} \\ Rw \cdot \cos(wt + \gamma) + WS_{Yh} \end{pmatrix} \quad (3)$$

By integration, it gives, in this air reference frame, the system of parametric equations for the trace:

$$\begin{pmatrix} x \\ y \end{pmatrix}_h (t) = \begin{pmatrix} WS_{Xh} \cdot t - \delta \cdot R \cdot \cos(wt + \gamma_h) + C_{Xh} \\ WS_{Yh} \cdot t + R \cdot \sin(wt + \gamma_h) + C_{Yh} \end{pmatrix} \quad (4)$$

The initial condition regarding position is:

$$\begin{pmatrix} x \\ y \end{pmatrix}_{t=0} = \begin{pmatrix} 0 \\ 0 \end{pmatrix} \quad (5)$$

since the aircraft is initially at the centre of the reference frame. The initial speed condition is:

$$\begin{pmatrix} \dot{x} \\ \dot{y} \end{pmatrix}_{t=0} = \begin{pmatrix} WS_{X_h} \\ TAS + WS_{Y_h} \end{pmatrix} \qquad (6)$$

since the aircraft has a speed vector oriented initially along the course axis.

At the initial instant t=0, the equation system (3) gives for initial air speed:

$$\begin{pmatrix} \dot{x} \\ \dot{y} \end{pmatrix}_{t=0} = \begin{pmatrix} \delta \cdot Rw \cdot \sin(\gamma) + WS_{X_h} \\ Rw \cdot \cos(\gamma) + WS_{Y_h} \end{pmatrix}$$

The initial speed condition (relation 6) implies:

$$\begin{cases} \cos(\gamma_h) = 1 \\ \sin(\gamma_h) = 0 \end{cases} \Rightarrow \gamma_h = 0 \qquad (7)$$

By taking account of these relations (7) in the system of equations (4), we obtain:

$$\begin{pmatrix} x \\ y \end{pmatrix}_h (0) = \begin{pmatrix} -\delta \cdot R \cdot + C_{X_h} \\ C_{Y_h} \end{pmatrix}$$

and the initial position condition (relation 5) implies:

$C_{X_h} = \delta.R.$ $C_{Y_h} = 0$

In a ground reference frame $X_t Y_t$, whose ordinate axis $Y_t$ is oriented along the course (track) of the aircraft, the system of parametric equations (1) becomes:

$$\begin{pmatrix} \dot{x} \\ \dot{y} \end{pmatrix}_t (t) = \begin{pmatrix} \delta \cdot Rw \cdot \sin(wt + \gamma_t) + WS_{X_t} \\ Rw \cdot \cos(wt + \gamma_t) + WS_{Y_t} \end{pmatrix}$$

By integration, it gives, in this ground reference frame, the system of parametric equations for the trace:

$$\begin{pmatrix} x \\ y \end{pmatrix}_t = \begin{pmatrix} WS_{X_t} \cdot t - \delta \cdot R \cdot \cos(wt + \gamma_t) + C_{X_t} \\ WS_{Y_t} \cdot t + R \cdot \sin(wt + \gamma_t) + C_{Y_t} \end{pmatrix}$$

The initial position condition:

$$\begin{pmatrix} x \\ y \end{pmatrix}_t (0) = \begin{pmatrix} 0 \\ 0 \end{pmatrix}$$

expressing that the aircraft is initially at the centre of the reference frame, and that of initial speed:

$$\begin{pmatrix} \dot{x} \\ \dot{y} \end{pmatrix}_t (0) = \begin{pmatrix} 0 \\ GS \end{pmatrix}$$

expressing that the aircraft has a speed vector initially oriented along the course axis $\vec{t}$ lead to the values of integration constants:

$C_{X_t} = \delta.R. \cos(\gamma_t)$ $C_{Y_t} = -R. \sin(\gamma_t)$ $\gamma_t = -\delta.(\text{Track}-\text{Heading})$ In the geographical reference frame $X_g Y_g$, used by the distance map, the system of parametric equations (1) becomes:

$$\begin{pmatrix} \dot{x} \\ \dot{y} \end{pmatrix}_g (t) = \begin{pmatrix} \delta \cdot Rw \cdot \sin(wt + \gamma_g) + WS_{X_g} \\ Rw \cdot \cos(wt + \gamma_g) + WS_{Y_g} \end{pmatrix}$$

By integration, it gives, in this geographical reference frame, the system of parametric equations for the trace:

$$\begin{pmatrix} x \\ y \end{pmatrix}_g = \begin{pmatrix} WS_{X_g} \cdot t - \delta \cdot R \cdot \cos(wt + \gamma_g) + C_{X_g} \\ WS_{Y_g} \cdot t + R \cdot \sin(wt + \gamma_g) + C_{Y_g} \end{pmatrix}$$

Figure 11:
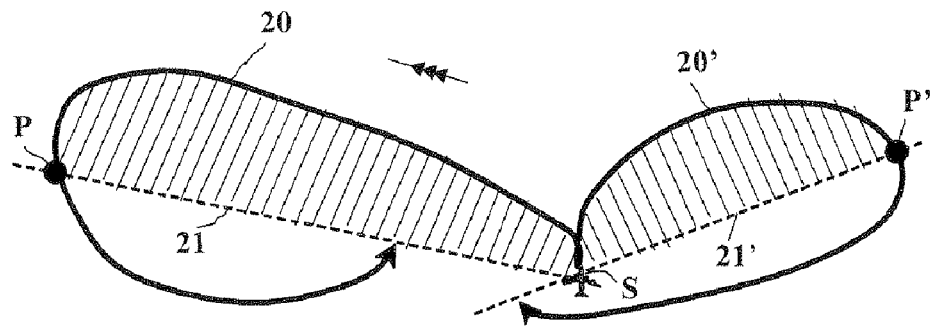

The initial position condition:

$$\begin{pmatrix} x \\ y \end{pmatrix}_g (0) = \begin{pmatrix} X_0 \\ Y_0 \end{pmatrix}$$

and the initial speed condition:

$$\begin{pmatrix} \dot{x} \\ \dot{y} \end{pmatrix}_g (0) = \begin{pmatrix} GS \cdot \sin(\text{track}) \\ GS \cdot \cos(\text{track}) \end{pmatrix}$$

lead to the values of integration constants:

$C_{X_t} = .R. \cos(\gamma_g)$ $C_{Y_t} = -R. \sin(\gamma_g)$ $\tan g(\gamma_g) = -\delta \cdot \tan(\text{Heading})$ or again:

$C_{X_g} = \text{Long} + \delta.R. \cos(\gamma_g)$ $C_{Y_g} = \text{Lat} - R. \sin(\gamma_g)$ $\gamma_g = \delta.\text{Heading} + k.\Pi$ FIG. 11 shows the ground traces 20 and 20' of the turns in the case of a local crosswind blowing towards the left of the course of the aircraft.

To stop the ground traces 20 and 20' thus parameterized at the points P and P' at which a change of course of given amplitude is made, it is possible to base oneself on the time necessary for the maneuver.

The transition time to change heading depends on the angular speed of the airplane and therefore on its angle of roll.

$$T_{transition} = \frac{H_2 - H_1}{w}$$

with:

$$w = \frac{TAS}{R} = \frac{g \cdot \tan \varphi_{roll}}{TAS}$$

The change of course (track) depends in addition on the wind conditions. The final heading may be written $$Heading_{final} = \begin{cases} Track_{final} - a\sin\left(\frac{WS_{X\,final}}{TAS}\right) + 2 \cdot (k+1) \cdot \Pi \\ Track_{final} + a\sin\left(\frac{WS_{X\,final}}{TAS}\right) + 2 \cdot k \cdot \Pi \end{cases}$$

and the duration of the transition time to change course:

$$T_{transition} = \frac{|Heading_{final} - Heading_{initial}|}{w}.$$

Figure 12:
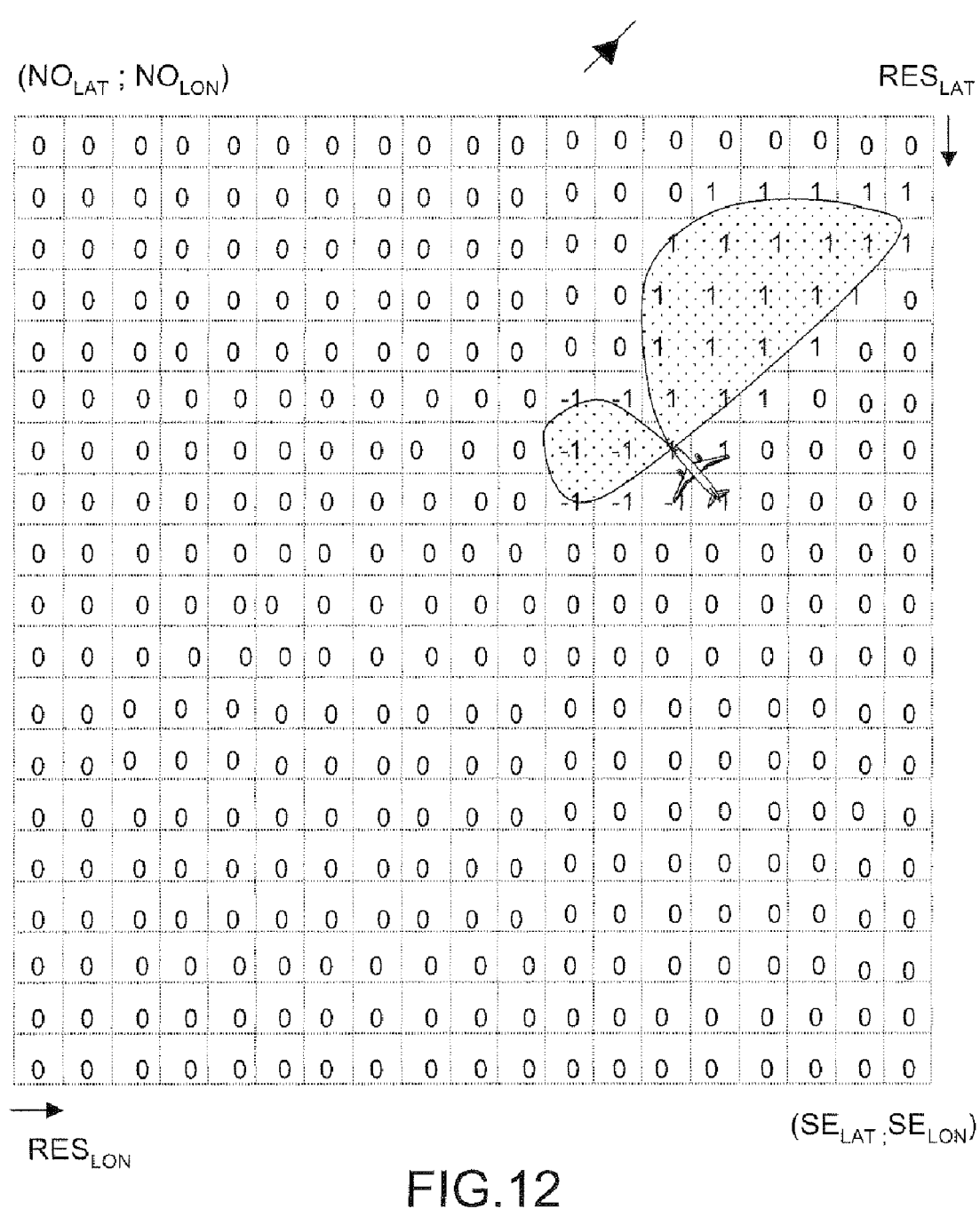

FIG. 12 shows, in a tagging on the same zone of deployment as FIGS. 1, 5, 7 and 9, a variant configuration of the two lateral zones of tight deployment tied to the aircraft $Z_{EVOL}$. In this variant, the lateral zones of tight deployment $Z_{EVOL}$ comprise, in addition to the mesh cells of the zone of deployment traversed by the ground traces of the turns, the mesh cells of the zones of deployment included at least in part inside the ground traces, in the spaces delimited by closed contours formed of the two parts (20, 20' FIG. 11) of the ground traces of the two circles (10, 11 FIG. 10) starting from the initial position of the aircraft (point S) up to the points (P, P' FIG. 11) corresponding to the chosen change of course, here 180°, and of two straight lines 21, 21' joining the ends P, P' of the two trace parts 20, 20' to the initial position S of the aircraft. This gives the two lateral zones of tight deployment $Z_{EVOL}$ a shape with two butterfly wing lobes.

Figure 13:
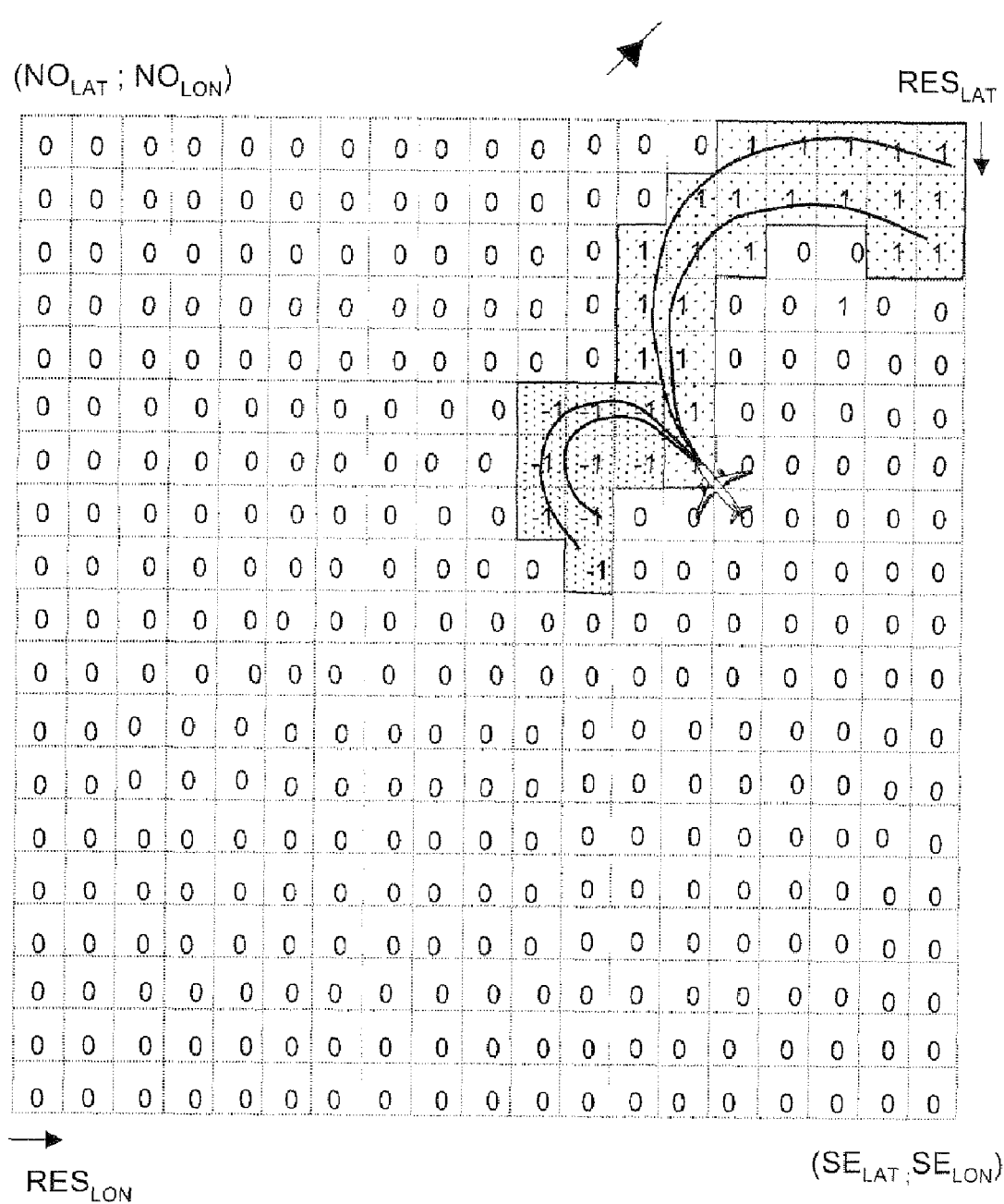

FIG. 13 shows, again in a tagging on the same zone of deployment as FIGS. 1, 5, 7, 9 and 12, another variant configuration of the lateral zones of tight deployment $Z_{EVOL}$ where the latter correspond to a span of radii of curvature and are delimited by two ground traces of turns on the same side according to two different radii of curvature, the shorter being able to go so far as to vanish.

The contours of the three types of risk region $Z_{CLIMB}$, $Z_{LEVEL}$, $Z_{TURN}$ and of the two lateral zones of tight deployment $Z_{EVOL}$ which have just been determined in the selected zone of deployment are used for a signaling of the risks destined for the crew of the aircraft. This signaling is based on a score of the risk level of the mesh cells of the location grid belonging entirely or in part to the two lateral zones of tight deployment $Z_{EVOL}$. This score $Z_{RISK}$ results from the application at the level of each mesh cell of the location grid belonging to the selected zone of deployment, of the formula:

$$Z_{RISK}(i,j) = Z_{EVOL}(i,j) \times [Z_{CLIMB}(i,j) + Z_{LEVEL}(i,j) + Z_{TURN}(i,j)] \quad (8)$$

It is recalled that:
the mesh cells are tagged within the location grid by coordinates i, j,
the score $Z_{EVOL}(i,j)$ equals +1 when the mesh cell belongs to the lateral zone of tight deployment $Z_{EVOL}$ situated to the right of the course of the aircraft, −1 when the mesh cell belongs to the lateral zone of tight deployment $Z_{EVOL}$ situated to the left of the course of the aircraft and 0 when the mesh cell is outside of the two lateral zones of tight deployment $Z_{EVOL}$, the score $Z_{CLIMB}(i,j)$ equals 1 when the mesh cell belongs to a region of the first type of risk region $Z_{CLIMB}$, that is uncrossable because it is above the crossing capabilities of the aircraft or forbidden to cross, and 0 in the converse case, the score $Z_{LEVEL}(i,j)$ equals 1 when the mesh cell belongs to a region of the second type of risk region $Z_{LEVEL}$, that is uncrossable after the adoption of a fallback trajectory profile, here after a flattening out of the aircraft, and 0 in the converse case, and the score $Z_{TURN}(i,j)$ equals 1 when the mesh cell belongs to a region of the third type of risk region $Z_{TURN}$ where the aircraft does not have full lateral freedom of maneuver, and 0 in the converse case.

The seven values of this score (relation 8), correspond to different risks of ground collision which are catalogued in the table below:

| $Z_{RISK}$ | Interpretation |
|---|---|
| −3 | Risk HIGH on the LEFT |
| −2 | Risk MEDIUM on the LEFT |
| −1 | Risk LOW on the LEFT |
| 0 | No measured risk for the cell |
| +1 | Risk LOW on the RIGHT |
| +2 | Risk MEDIUM on the RIGHT |
| +3 | Risk HIGH on the RIGHT |

The signaling of the risks of ground collision consists of the emitting of alarms which depend on the highest score, in absolute value, found at each instant for the mesh cells of the location grid belonging to the lateral zones of tight deployment and which are defined in accordance with the table below:

| $Z_{RISK}$ | Interpretation | Risks masked | Audible Alarms |
|---|---|---|---|
| −3 and 3 | Risk HIGH on both sides | −2, −1, +1, +2 | "Avoid TERRAIN" |
| −3 | Risk HIGH on the LEFT | −2, −1, +1, +2 | "Avoid LEFT" |
| +3 | Risk HIGH on the RIGHT | −2, −1, +1, +2 | "Avoid RIGHT" |
| −2 and +2 | Risk MEDIUM on the LEFT | −1, +1 | "Terrain AROUND" |
| −2 | Risk MEDIUM on the LEFT | −1, +1 | "Caution LEFT" |
| +2 | Risk MEDIUM on the RIGHT | −1, +1 | "Caution RIGHT" |
| −1 | Risk LOW on the LEFT | N/A | "Terrain LEFT" |
| +1 | Risk LOW on the RIGHT | N/A | "Terrain RIGHT" |

Figure 14:
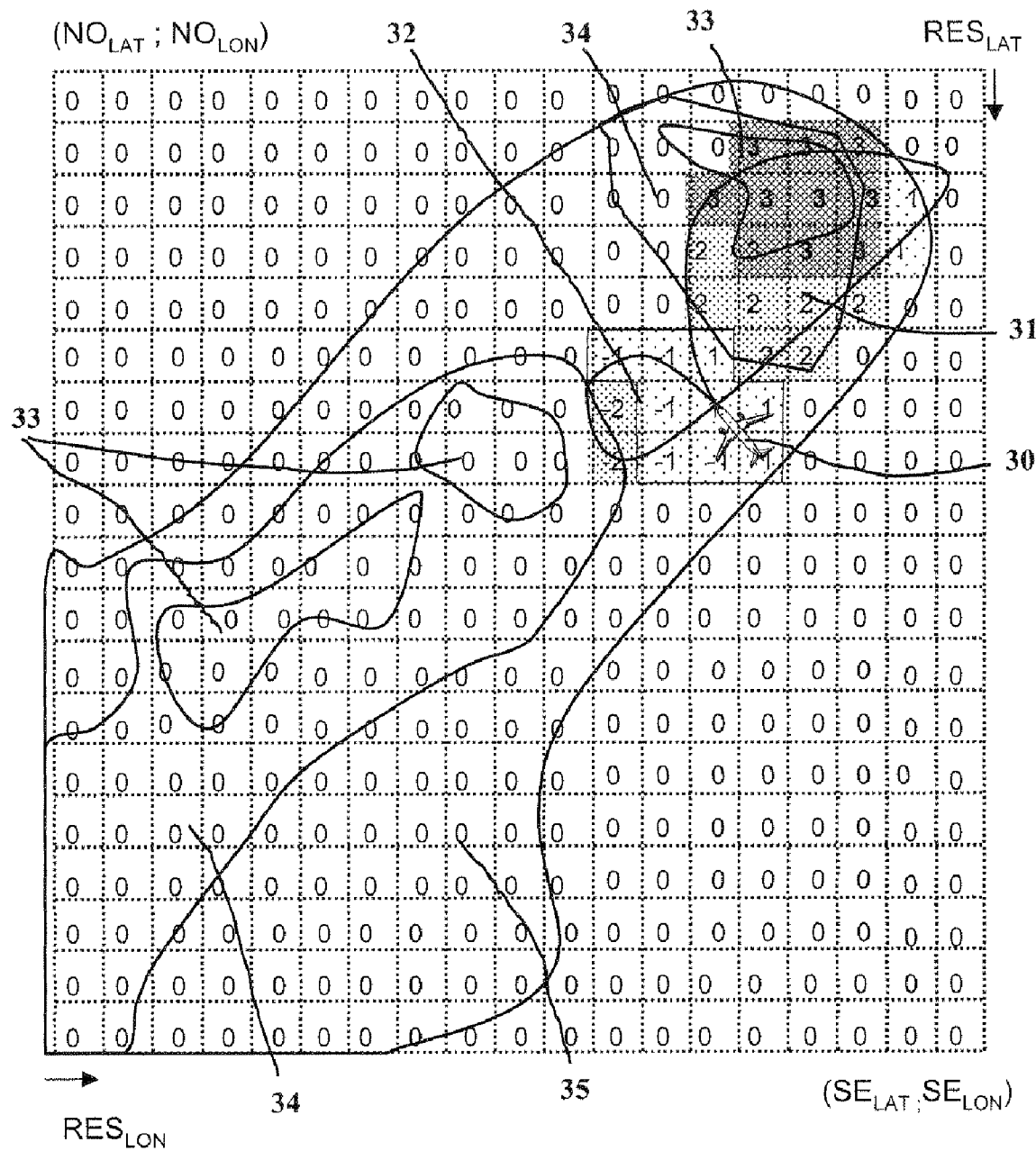

These various alarms are communicated to the crew of the aircraft, either orally, or visually on a navigation map, by a distinctive marking of the mesh cells belonging to the lateral zones of tight deployment, as shown in FIG. 14 relating to the variant embodiment with lateral zones of tight deployment having the shapes shown in FIG. 12.

Depicted in FIG. 11, overlaid on the mesh of the location grid ruled on the selected zone of deployment, are:

the instantaneous position 30 of the aircraft with the contours 31 and 32 of the two lateral zones right and left of tight deployment $Z_{EVOL}$ tied to this position which already appear in FIG. 12, the contours 33 of the regions of the first type of risk region $Z_{CLIMB}$ shown in FIG. 1, situating the forbidden over flight regions and the regions that are uncrossable because they are above the crossing capabilities of the aircraft, the contours 34 of the regions of the second type of risk region $Z_{LEVEL}$ shown in FIG. 5, situating the uncrossable regions as soon as the aircraft carries out a flattening-out maneuver, the contours 35 of the regions of the third type of risk region $Z_{TURN}$ shown in FIG. 7, situating the regions where the aircraft sees its freedom of lateral deployment limited, and the risk level scores assigned to each mesh cell of the location grid in application of the previous score formula.

It is noted that, by construction, the first type of risk region $Z_{CLIMB}$ has its contours 33 included in those 34 of the second type of risk region $Z_{LEVEL}$. Specifically, a terrain portion uncrossable by the aircraft using its best climb performance remains, a fortiori uncrossable if the pilot performs a flattening out. Likewise the contours 34 of the second type of risk region $Z_{LEVEL}$ are included in those 35 of the third type of risk region $Z_{TURN}$ constituting the margins about the uncrossable regions necessary for total freedom of lateral deployment for the aircraft.

In the situation shown in FIG. 14, the points whose risk level score is the highest (scores +3 or −3) belong to the right lateral zone of tight deployment 31, which prompts the emission, for the attention of the crew of the aircraft, of an alarm of high risk to the right, either audible, or visual, or at one and the same time audible and visual.

Visual displaying of the alarms can be done by the displaying, in the cockpit of the aircraft, of a navigation map showing the first, second and third types of risk regions $Z_{CLIMB}$ $Z_{LEVEL}$, and $Z_{TURN}$ under different textures and the points of the lateral zones right and left of tight deployment $Z_{EVOL}$ in colors depending on the risk level score allocated to them, for example a red color for a high risk level, a strong yellow color for a medium risk level, a pale yellow color for a low risk level and a green color for the remainder of the points of the map with a zero risk level. It makes it possible to confirm the mental evaluation by the pilot of the aircraft of the turning radius permitted to the aircraft, taking account of the local wind. This display can also show the tight lateral zones of deployment $Z_{EVOL}$ which arise as a sort of pair of mustaches attached to the silhouette of the aircraft and allow the crew to locate, at a glance, the relative position with respect to the aircraft and the configuration of a risk region at the origin of an audible alarm.

Figure 15:
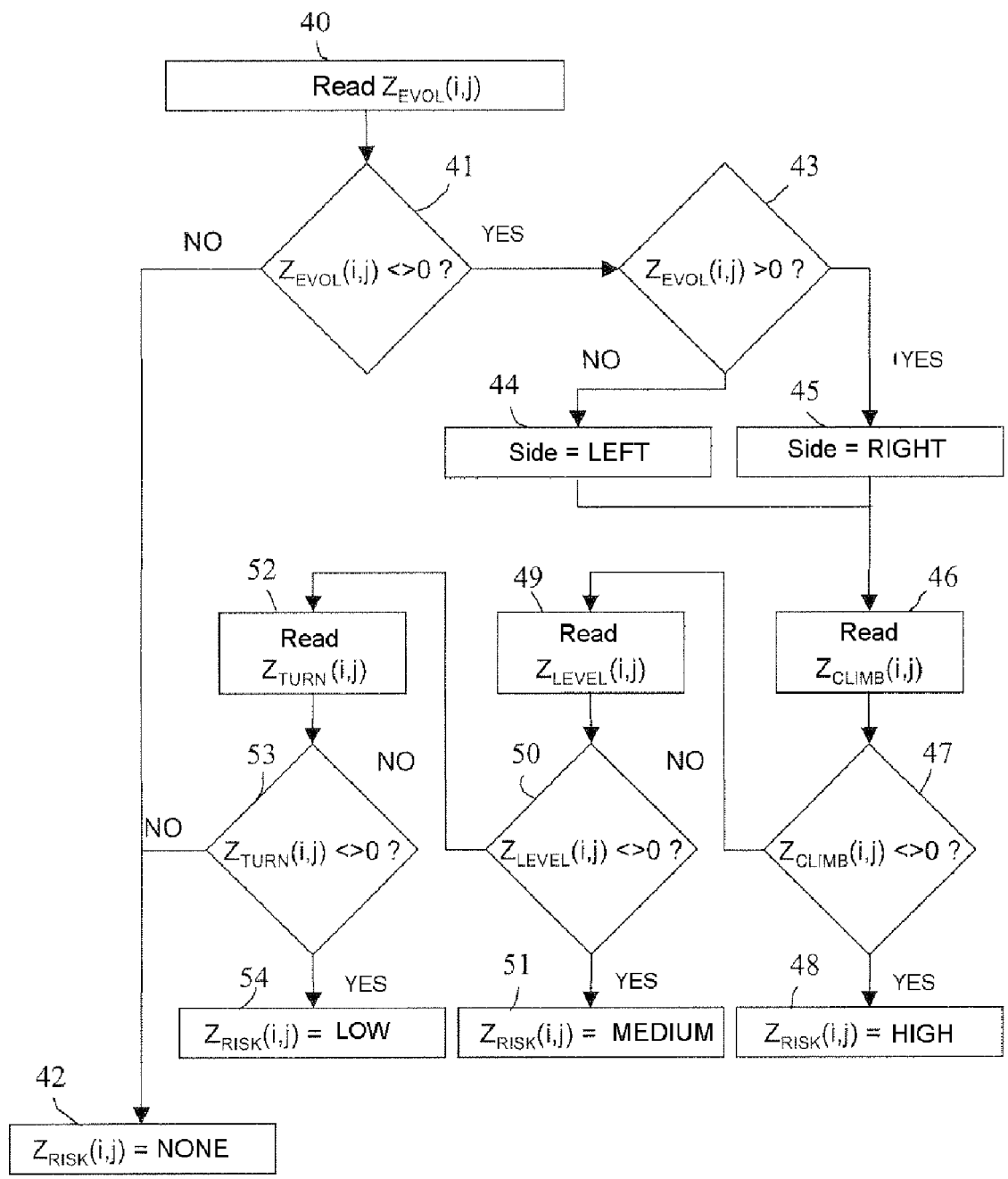

A way of effecting a risk level score of a mesh cell of the location grid of a selected zone of deployment culminating in the same result as formula (8) is illustrated by the logic flowchart of FIG. 15. The latter consists:

during a first step 40, in reading the value of the marking $Z_{EVOL}(i,j)$ tagging the possible membership of the mesh cell concerned with coordinates i, j in the location grid, in one or the other of the lateral tight zones of deployment (31, 32 FIG. 14), during a second step 41, in comparing the value of the marking $Z_{EVOL}(i,j)$ with the zero value 0, during a third step 42 in declaring a zero risk level when the comparison of the second step 41 culminates in an equality outcome, during a fourth step 43, in testing whether the value of the marking $Z_{EVOL}(i,j)$ is or is not positive when the comparison of the second step 41 culminates in an inequality outcome, during a fifth step 44, in proclaiming a membership of the mesh cell concerned in the left lateral zone of tight deployment when the test of the fourth step 43 is negative, during a sixth step 45, in proclaiming a membership of the mesh cell concerned in the right lateral zone of tight deployment when the test of the fourth step 43 is positive, during a seventh step 46, in reading the value of the marking $Z_{CLIMB}(i,j)$ tagging the possible membership of the mesh cell concerned with coordinates i, j in the location grid, in an inaccessible region of the first type of risk region (33 FIG. 14), during an eighth step 47, in comparing the value of the marking $Z_{CLIMB}(i,j)$ with the zero value 0 to note or otherwise whether there is equality, during a ninth step 48 in declaring a high risk level when the comparison of the eighth step 47 culminates in an inequality outcome, during a tenth step, 49, when the comparison of the eighth step 47 culminates in an equality outcome, in reading the value of the marking $Z_{LEVEL}(i,j)$ tagging the possible membership of the mesh cell concerned with coordinates i, j in the location grid, in an inaccessible region of the second type of risk region (34 FIG. 14), during an eleventh step 50, in comparing the value of the marking $Z_{LEVEL}(i,j)$ with the zero value 0, during a twelfth step 51 in declaring a medium risk level when the comparison of the eleventh step 50 culminates in an inequality outcome, during a thirteenth step 52, when the comparison of the eleventh step 50 culminates in an equality outcome, in reading the value of the marking $Z_{TURN}(i,j)$ tagging the possible membership of the mesh cell concerned with coordinates i, j in the location grid, in a region with limited freedom of lateral deployment belonging to the third type of risk region (35 FIG. 14), during a fourteenth step 53, in comparing the value of the marking $Z_{TURN}(i,j)$ with the zero value 0, during a fifteenth step 54 in declaring a low risk level when the comparison of the eleventh step 50 culminates in an inequality outcome, and during a sixteenth step 42 in declaring a zero risk level when the comparison of the fourteenth step 53 culminates in an equality outcome.

Figure 16:
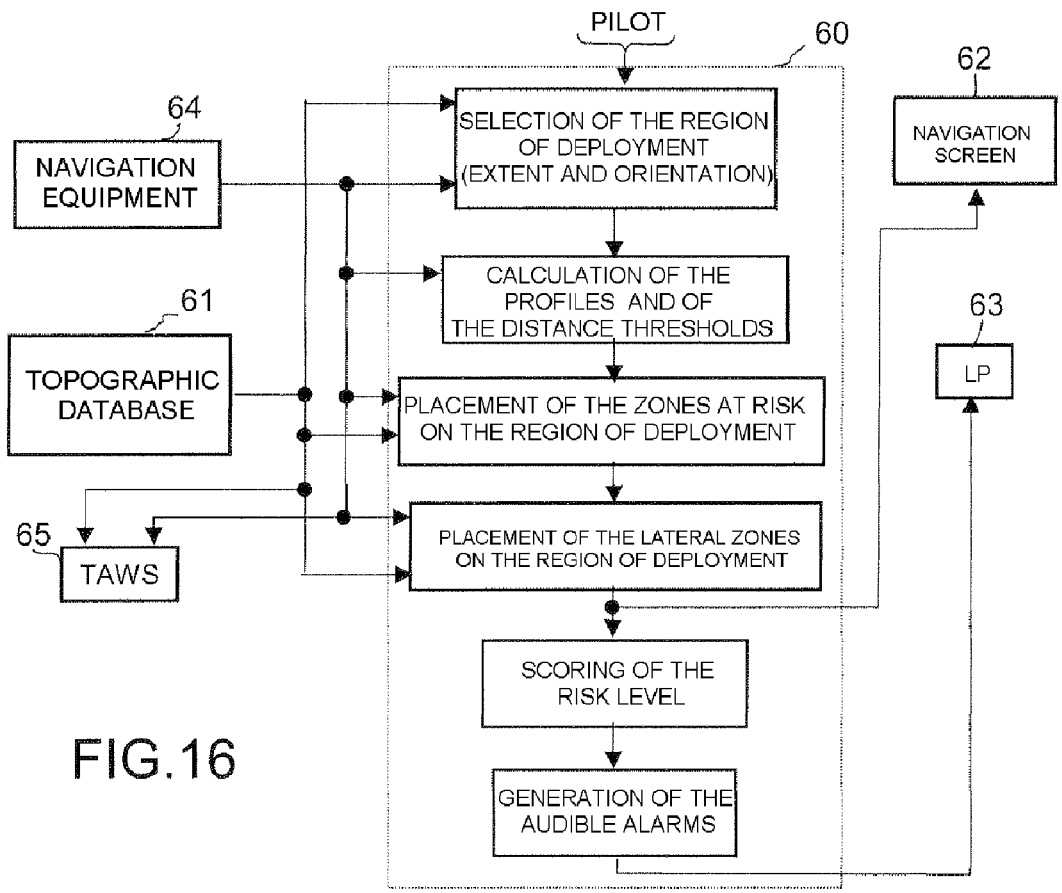

FIG. 16 shows a device for signaling risks in its functional environment aboard an aircraft. The device for signaling risk is composed essentially of a computer 60 associated with a terrain elevation and forbidden over flight zones database 61 and with visual display 62 and audible 63 devices. The terrain elevation and forbidden over flight zones database 61 is represented as being embedded onboard the aircraft but it can equally well be placed on the ground and accessible from the aircraft by radio-transmission. The computer 60 can be a computer specific to the generation of the signaling of the risks prompted by the presence of relief or of forbidden over flight zones in the zone of deployment of the aircraft or a computer shared with other tasks such as flight management or automatic pilot. As regards risk signaling, it receives from the navigation equipment 64 of the aircraft, the main flight parameters, including the position of the aircraft in latitude, longitude and altitude, and the direction and the amplitude of its speed vector. On the basis of these flight parameters and of possible instructions originating from the pilot of the aircraft, it determines at each instant:

the position at the surface of the terrestrial globe, the orientation and the dimensions of a zone of deployment in which to search for the various types of risk regions and the possible forbidden over flight zones, the locations and the contours of the two lateral zones of tight deployment tied to the instantaneous position of the aircraft, the vertical flight profiles corresponding to a climbing of the aircraft at maximum incidence and to a flattening out, and a horizontal distance threshold for free lateral deployment of the aircraft.

On the basis of the information of the terrain elevation and database forbidden over flight zones 61, it extracts a location grid mapping the selected zone of deployment. It thereafter places, on this location grid:

the contours of the first type of risk regions that it receives from an item of TAWS equipment 65 or that it calculates by taking account of the vertical flight profile corresponding to a climbing of the aircraft at maximum incidence, for example, by means of a distance transform, the placement consisting in formulating the marking $Z_{CLIMB}$ of the mesh cells of the location grid belonging to the zone of deployment employed, the contours of the second type of risk region that it calculates by taking account of the vertical flight profile corresponding to a flattening out of the aircraft, for example, by means of a distance transform, the placement consisting in formulating the marking $Z_{LEVEL}$ of the mesh cells of the location grid belonging to the zone of deployment employed, the contours of the third type of risk region that it calculates by taking account of the contours of the first and second type of risk region, of a minimum vertical over flight distance and of the horizontal distance threshold to be complied with, the placement consisting in formulating the marking $Z_{TURN}$ of the mesh cells of the location grid belonging to the zone of deployment employed, and the contours of the two zones of tight lateral deployment, the placement consisting in formulating the marking $Z_{EVOL}$ of the mesh cells of the location grid belonging to the zone of deployment employed.

Once these various zones have been placed on the location grid, it undertakes the formulation of an image representing them displayable on a screen 66 of the cockpit, for example the ND navigation screen, the risk level scoring of the mesh cells of the location grid belonging to the two lateral tight navigation zones and, in the presence of a nonzero risk level score, the emitting of audible alarms specifying the risk level and the situation on the right or on the left of the aircraft of the lateral zone of tight deployment containing the mesh cell or mesh cells exhibiting the highest risk level scores.

The invention claimed is:

1. A device for signaling risks incurred by a craft on account of real or regulatory obstacles situated in its domain of progress, comprising:

means for selecting a zone of deployment, means for considering various types of risk region of the selected zone of deployment, of which a first type of risk region consisting of regions inaccessible to the craft because of its capabilities of crossing at a time and/or of regulatory forbidden crossing regions, means for determining a second type of risk region of the selected zone of deployment, including the regions inaccessible to the craft after an adoption of a fallback trajectory profile envisaged in advance, and means for determining, in the selected zone of deployment, of two lateral regions of tight deployment, to a right and to a left with respect to a position of the craft and to a direction of a course that it follows, defined on a basis of a ground trace of the trajectory which would be traversed by the craft if it performed a change of direction of a magnitude determined during a turn with radius of curvature also determined.

2. The device as claimed in claim 1, further comprising: means for determining, in the selected zone of deployment, a third type of risk region surrounding the regions of first and second types and constituting margins necessary for a free lateral deployment of the craft.

3. The device as claimed in claim 2, further comprising: means for determining, in the selected zone of deployment, of two lateral regions of tight deployment, to the right and to the left with respect to the position of the craft and to the direction of the course that it follows, defined on the basis of the ground trace of the trajectory which would be traversed by the craft if it performed a change of direction of a magnitude determined during a turn with radius of curvature also determined, detection means for detecting points of the lateral zones of tight deployment belonging to one or more types of risk region, and alarm means triggered by the detection means at each detection of a point of a lateral zone of deployment belonging to at least one type of risk region ($Z_{CLIMB}$, $Z_{LEVEL}$ or $Z_{TURN}$).

4. The device as claimed in claim 3, wherein the detection means comprise means for scoring of the risk level allocating to each point of the two lateral regions of tight deployment, a score corresponding to:

a zero risk level when the point considered belongs to no type of risk region taken into consideration, a low risk level when the point considered belongs only to the third type of risk region not exhibiting medium the margins necessary for a free lateral deployment, a medium risk level when the point considered belongs to the second type of risk region constituting a threat only after the adoption of the fallback trajectory profile, and a high risk level when the point considered belongs to the first type of risk region constituting a threat since it is above the current capabilities of crossing of the craft or/and regulatory forbidden crossing capabilities, the alarm means delivering an alarm level corresponding to the larger risk level score assigned to the points of the two lateral regions of tight deployment and signaling the origin side of the threat by consideration of the right or left nature of the lateral region or regions of tight deployment comprising the points with larger risk score.

5. The device as claimed in claim 3, wherein the alarm means produce various alarm levels according to the types of risk region detected in the lateral zones of tight deployment.

6. The device as claimed in claim 3, wherein the alarm means deliver distinct alarms depending at one and the same time on the lateral zone of tight deployment concerned, right or left, and on the types of risk region detected in said lateral zone of tight deployment.

7. A risk level map obtained with the device as claimed in claim 2, wherein the device displays, in a distinct manner, within the zone of deployment, a first type of region inaccessible to the craft because of its crossing capabilities at the time and/or regulatory forbidden crossing capabilities, a second type of region inaccessible to the craft after the adoption of a fallback trajectory profile, a third type of region constituting margins necessary, about the first and second types of risk region for a free lateral deployment of the craft and the parts of the zone of deployment complementary to the various types of region taken into account.

8. A method of formulating the risk level map as claimed in claim 7 comprising the following steps:

formulation of contours of region belonging to the first type of risk region by application, to elements of a terrain elevation database covering the zone of deployment of the craft, of a constrained distance transform having, as source point, a point in a neighborhood of an instantaneous position of the craft and, as a constraint, a path profile adopting after an arbitrarily fixed anticipation time, a maximum climb slope permitted for the craft, and complementation of the contours of the regions of the first type of risk region by the contours of regions with regulatory forbidden crossing that are extracted from a database of forbidden zones, formulation of the contours of regions belonging to the second type of risk region by application, to the elements of the terrain elevation database, of a constrained distance transform having, as source point, a point in the neighborhood of the instantaneous position of the craft and, as the constraint, a path profile adopting after an arbitrarily fixed anticipation time, a slope of the fallback trajectory profile, and allocation of distinct appearances to the points of the first and second types of risk region.

9. The method for formulating the risk level map as claimed in claim 7 comprising the following steps:

formulation of contours of region belonging to the first type of risk region by application, to the elements of a terrain elevation database covering the zone of deployment of the craft, of a constrained distance transform having, as source point, a point in the neighborhood of the instantaneous position of the craft and, as a constraint, a path profile adopting after an arbitrarily fixed anticipation time, the maximum climb slope permitted for the craft and complementation of the contours of the regions of the first type of risk region by the contours of regions with regulatory forbidden crossing that is extracted from a database of forbidden zones, formulation of the contours of regions belonging to the second type of risk region by application, to the elements of the terrain elevation database, of a constrained distance transform having, as source point, a point in the neighborhood of the instantaneous position of the craft and, as the constraint, a path profile adopting after an arbitrarily fixed anticipation time, the slope of the fallback trajectory profile, determination, as a function of the performance of the craft, of a minimum horizontal maneuvering distance allowing the craft to perform a complete turn, estimation of the distances with respect to the contours of the regions of the first and second types of risk region by means of a distance transform having the first and second types of risk region as source points, placement of contours about the regions of the first and second type of risk regions at the smallest distances complying at one and the same time with the minimum horizontal maneuvering distance and a minimum vertical distance with respect to the relief and adoption of these contours in a guise of contours of the regions of third type, and allocation of distinct appearances to the points of the various types of risk region.

10. The method as claimed in claim 9, further comprising the following steps:

formulation, on either side of the instantaneous position of the craft and of its instantaneous course, of two lateral regions of tight deployment, tied to the instantaneous position of the craft and defined on the basis of the ground trace of the craft performing a change of direction determined during a turn with radius of curvature also determined, and distinctive marking of the points of the two lateral regions of tight deployment as a function of their membership in regions of first, second or third type.

11. The method as claimed in claim 9, further comprising the following steps:

formulation, on either side of the instantaneous position of the craft and of its instantaneous course, of two lateral regions of tight deployment, tied to the instantaneous position of the craft and corresponding, on one side and on the other, to the surfaces lying between two complete turns of the craft performed on one and the same side with different radii of curvature, and distinctive marking of the points of the two lateral regions of tight deployment as a function of their membership in regions of first, second or third type.

12. The method as claimed in claim 8 further comprising the following steps:

formulation, on either side of the instantaneous position of the craft and of its instantaneous course, of two lateral regions of tight deployment, tied to the instantaneous position of the craft and defined on the basis of the ground trace of the craft performing a change of direction determined during a turn with radius of curvature also determined, and distinctive marking of the points of the two lateral regions of tight deployment as a function of their membership in regions of first, second or third type.

13. The method as claimed in claim 12, applied to an aircraft, wherein the two lateral regions of tight deployment are defined on the basis of the traces left on the ground, by trajectories carried by turns of like radius and that are deformed by the drift due to local wind.

14. The method as claimed in claim 8 further comprising the following steps:

formulation, on either side of the instantaneous position of the craft and of its instantaneous course, of two lateral regions of tight deployment, tied to the instantaneous position of the craft and corresponding, on one side and on the other, to the surfaces lying between two complete turns of the craft performed on one and the same side with different radii of curvature, and distinctive marking of the points of the two lateral regions of tight deployment as a function of their membership in regions of first, second or third type.

15. The method as claimed in claim 14, applied to an aircraft, wherein the two lateral regions of tight deployment are defined on the basis of the traces left on the ground, by trajectories carried by turns of like radius and that are deformed by the drift due to the local wind.

16. The risk levels map as claimed in claim 7, wherein the device displays, in a distinct manner, two lateral regions of tight deployment, placed to the right and to the left with respect to the position occupied by the craft and to the direction of the course that it follows, and defined on the basis of an arbitrary amplitude of change of direction and of an arbitrary amplitude of turning radius.

17. The device as claimed in claim 2, comprising display means showing the selected zone of deployment in the form of a map of zones at risk presenting under distinct appearances each of the types taken into account of risk region and the part of the selected zone of deployment complementary to the various types taken into account of risk region.

18. The device as claimed in claim 1, further comprising:
   detection means for detecting points of the lateral zones of tight deployment belonging to one or more types of risk region, and
   alarm means triggered by the detection means at each detection of a point of a lateral zone of tight deployment belonging to at least one type of risk region.

19. The device as claimed in claim 18, wherein the alarm means produce various alarm levels according to the types of risk region detected in the lateral zones of tight deployment.

20. The device as claimed in claim 18, wherein the alarm means deliver distinct alarms depending simultaneously on the lateral zone of tight deployment concerned, right or left, and on the types of risk region detected in said lateral zone of tight deployment.

21. The device as claimed in claim 18, for aircraft, wherein:
   the first type of risk region corresponds to uncrossable regions for the aircraft assuming that it acquires, after an arbitrarily fixed anticipation time (Ta1), a maximum climb slope or/and to the regions whose crossing is regulatory forbidden to it,
   the second type of risk region corresponds to the regions uncrossable by the aircraft assuming that it holds a horizontal plateau after an arbitrarily fixed anticipation time,
   the third type of risk region corresponds to marginal fringes surrounding the regions of the first and second types, of width corresponding to that necessary for the aircraft to perform a complete flat turn with a shortest permitted radius, and
   the two lateral regions of tight deployment correspond to an arbitrary amplitude change of direction obtained during a turn of arbitrary radius of curvature.

22. The device as claimed in claim 18, for aircraft, wherein the two lateral regions of tight deployment are defined on the basis of the traces left on the ground, by trajectories carried by turns of like radius, and deformed by the drift due to the local wind.

23. The device as claimed in claim 1, comprising display means showing the selected zone of deployment in the form of a map of zones at risk presenting under distinct appearances each of the types taken into account of risk region and the part of the selected zone of deployment complementary to the various types taken into account of risk region.

24. A risk level map obtained by the device as claimed in claim 1, wherein the device displays, in a distinct manner, within a zone of deployment, a first type of region inaccessible to the craft because of its crossing capabilities at the time and/or regulatory forbidden crossing capabilities, a second type of region inaccessible to the craft after the adoption of a fallback trajectory profile and the parts of the zone of deployment complementary to the various types of region taken into account.

25. The risk levels map as claimed in claim 24, wherein the device displays, in a distinct manner, two lateral regions of tight deployment, placed to the right and to the left with respect to the position occupied by the craft and to the direction of the course that it follows, and defined on the basis of an arbitrary amplitude of change of direction and of an arbitrary amplitude of turning radius.

* * * * *